US008887353B2

(12) United States Patent  
Sharratt et al.

(10) Patent No.: US 8,887,353 B2  
(45) Date of Patent: Nov. 18, 2014

(54) REPEL ASSEMBLY AND METHOD

(71) Applicant: Waxman Consumer Products Group, Inc., Bedford Heights, OH (US)

(72) Inventors: Jason A. Sharratt, Wadsworth, OH (US); Mitchell Balley, Westlake, OH (US); Matthew Smith, Wooster, OH (US)

(73) Assignee: Waxman Consumer Products Group Inc., Bedford Heights, OH (US)

( * ) Notice: Subject to any disclaimer, the term of this patent is extended or adjusted under 35 U.S.C. 154(b) by 0 days.

(21) Appl. No.: 13/929,173

(22) Filed: Jun. 27, 2013

(65) Prior Publication Data

US 2014/0000064 A1 Jan. 2, 2014

Related U.S. Application Data

(60) Provisional application No. 61/798,803, filed on Mar. 15, 2013, provisional application No. 61/666,419, filed on Jun. 29, 2012.

(51) Int. Cl.
*B60B 33/00* (2006.01)
*A47B 91/06* (2006.01)
(52) U.S. Cl.
CPC ............ *A47B 91/06* (2013.01); *A47B 2091/063* (2013.01)
USPC ...................................................... 16/18 CG
(58) Field of Classification Search
USPC ........ 16/42 R, 42 T; 248/188.9, 188.4, 188.2, 248/346.11
See application file for complete search history.

(56) References Cited

U.S. PATENT DOCUMENTS 313,097 A * 3/1885 Michelson ..................... 16/18 R
1,068,485 A * 7/1913 Davidson ............................ 16/26

(Continued)

FOREIGN PATENT DOCUMENTS

EP 733323 A1 9/1996
FR 2762486 A1 10/1998
FR 2762496 A1 10/1998

OTHER PUBLICATIONS

International Search Report dated Nov. 26, 2013 and Written Opinion of the International Searching Authority dated Nov. 26, 2013 for PCT International Application No. PCT/US2013/048579, filed Jun. 28, 2013. PCT International Application No. PCT/US2013/048579 corresponds to and claims priority from the co-pending application (U.S. Appl. No. 61/666,419, filed Jun. 29, 2012) and co-pending (U.S. Appl. No. 29/449,832, filed Mar. 15, 2013) and co-pending (U.S. Appl. No. 61/798,803, filed Mar. 15, 2013) of the present application. (13 pages).

*Primary Examiner* — Chuck Mah
(74) *Attorney, Agent, or Firm* — Tarolli, Sundheim, Covell & Tummino LLP

(57) ABSTRACT

A repel assembly and method includes an engagement surface having an adhesive plane for securing to an object, a plurality of attachment spikes extending from the engagement surface at an angle transverse to the adhesive plane and a transport surface for supporting a fixture coupled to the plurality of attachment spikes, the fixture being positioned between the engagement surface and the transport surface. The repel assembly further includes an annular ring having an upper and lower ring coupled to the repel assembly, the lower ring having first and second ends spaced by a wiper body such that the annular ring repels debris from contacting and/or collecting on the transport surface.

17 Claims, 27 Drawing Sheets

(56) References Cited

U.S. PATENT DOCUMENTS

| | | | |
|---|---|---|---|
| 1,208,546 A | 12/1916 | Hachmann | |
| 1,804,437 A | 5/1931 | Rice | |
| 1,824,923 A * | 9/1931 | Parsons | 248/188.9 |
| 1,849,570 A | 3/1932 | Duncan, Jr. | |
| 1,954,130 A | 4/1934 | Higgins | |
| 1,981,728 A | 11/1934 | Harris | |
| 2,046,384 A * | 7/1936 | Katcher | 248/188.1 |
| 2,056,957 A * | 10/1936 | Colbridge | 248/188.9 |
| 2,206,120 A | 7/1940 | Peterson | |
| 2,283,978 A | 5/1942 | Eberle | |
| 2,471,958 A * | 5/1949 | Humphreys | 16/18 CG |
| 2,584,295 A | 2/1952 | Sanzenbacher | |
| 2,953,180 A | 9/1960 | Kyles | |
| 3,183,545 A | 5/1965 | Bergstrom | |
| 3,441,974 A * | 5/1969 | Dean | 16/33 |
| 3,592,423 A * | 7/1971 | Mui | 248/616 |
| 3,691,590 A * | 9/1972 | Drabert | 16/18 R |
| 4,800,617 A * | 1/1989 | Yeh | 16/18 CG |
| 5,001,808 A * | 3/1991 | Chung | 16/18 CG |
| 5,081,740 A | 1/1992 | Smith | |
| 5,371,920 A * | 12/1994 | Rainville | 16/18 CG |
| 5,615,450 A | 4/1997 | Butler | |
| 5,802,669 A * | 9/1998 | Wurdack | 16/42 R |
| 6,647,589 B1 * | 11/2003 | Youngwith | 16/18 CG |
| 6,869,052 B2 | 3/2005 | Keast et al. | |
| 7,234,199 B2 * | 6/2007 | Bushey | 16/42 R |
| 8,438,701 B2 | 5/2013 | Bushey | |
| 8,667,645 B2 | 3/2014 | Smith | |
| 2004/0051014 A1 | 3/2004 | Keast et al. | |
| 2004/0088821 A1* | 5/2004 | Imperato | 16/18 CG |
| 2005/0081330 A1* | 4/2005 | Edwards | 16/42 R |
| 2005/0183234 A1* | 8/2005 | Bushey et al. | 16/42 R |
| 2007/0011845 A1 | 1/2007 | Bushey et al. | |
| 2008/0179471 A1 | 7/2008 | Verdelli | |
| 2008/0258023 A1* | 10/2008 | Desmarais | 248/188.9 |
| 2010/0050389 A1 | 3/2010 | Robinson et al. | |
| 2011/0191985 A1 | 8/2011 | Hirth | |
| 2012/0097818 A1* | 4/2012 | Desmarais | 248/345.1 |

* cited by examiner

REPEL ASSEMBLY AND METHOD

CROSS REFERENCES TO RELATED APPLICATIONS

The following application claims priority to U.S. Provisional Patent Application Ser. No. 61/666,419 filed Jun. 29, 2012 entitled ATTACHMENT GLIDER, and U.S. Provisional Patent Application No. 61/798,803 filed Mar. 15, 2013 entitled REPEL ASSEMBLY AND METHOD. The above-identified applications are incorporated herein by reference in their entirety for all purposes.

TECHNICAL FIELD

The present disclosure relates to a repel assembly and method, and more particularly, a repel assembly and method that is secured to or near an attachment glider on an object to be moved preventing the collection of debris on the attachment glider.

BACKGROUND

In the moving industry, it is quite usual to face the situation of having to move large, heavy, and sometimes awkwardly shaped objects such as furniture within the confines of buildings. The movement of large objects and furniture are not limited to the venue of commercial buildings, but equally experienced in residential settings with interest in relocating furniture to achieve a new floor plan or moving the furniture or large objects to a new home. Other occurrences arise from office downsizing, team wiring upgrades, etc. that frequently mandate office reconfigurations requiring that the furniture be moved or rotated. Furniture is also frequently moved for example, in healthcare and educational facilities for cleaning. In these instances, as in the installation of modular carpet, it is desirable to move the furniture quickly, with the least possible effort and, preferably, after hours with a limited number of workers.

Office equipment is usually moved with a hand truck, four-wheel dolly, or the like and can take several individuals working together. The work is hard, labor expensive and injuries occur. Other furniture, such as workstations, computers, etc. are also difficult to move. The preferable method of moving the heavy objects is for professional movers to pick the object up and carry it by hand, but this is not always an economically feasible or a possible arrangement because of the lack or cost of labor.

An alternative to hand trucks and dollies for movement of furniture and objects includes the use of attachment gliders, typically placed under the legs of the object to be moved. The attachment glider comprises various contact surfaces for engaging the type of material forming the floor across which the object or furniture is moved. For example, for a wood or tile floor, the attachment glider will have a textile surface such as felt. For a floor covered with carpet, the attachment glider will have a hard smooth surface such as plastic. Such surfaces reduce the friction and/or wear that occurs from the object moving across the floor's surface.

One example of hand glider assemblies are those shown in U.S. patent application Ser. No. 13/491,703 entitled ATTACHMENT GLIDER that was filed on Jun. 8, 2012. The ATTACHMENT GLIDER application was assigned to the assignee of the present disclosure and is incorporated herein by reference.

SUMMARY

One example embodiment includes a repel assembly comprises an engagement surface having an adhesive plane for securing to an object, a plurality of attachment spikes extending from the engagement surface at an angle transverse to the adhesive plane and a transport surface for supporting a fixture coupled to the plurality of attachment spikes, the fixture being positioned between the engagement surface and the transport surface. The repel assembly further includes an annular ring having an upper and lower ring coupled to the repel assembly, the lower ring having first and second ends spaced by a wiper body such that the annular ring repels debris from contacting and/or collecting on the transport surface.

Another example embodiment includes a polymeric annular repel ring for the prevention of attraction, contact, and/or collection of debris to an attachment glider. The annular repel ring comprises an upper ring and a lower ring spaced by a wiper body. The upper ring is for securing to an attachment glider during use. The lower ring divergently extends from the upper ring from a first end to a second end, forming the wiper body therebetween.

While another example embodiment includes a method of repelling debris from an attachment glider. The steps comprise surrounding an attachment glider with an annular repel ring, the annular repel ring having upper and lower rings defined by a wiper body therebetween and divergently extending the wiper body away from the upper ring toward the lower ring. The steps also include constructing the wiper body to allow for flexible in and out rotation of at least a portion of the lower ring relative to the upper ring.

Yet another example embodiment of the present disclosure comprises an assembly for repelling or preventing the collection of debris at the base of an object. The assembly includes a support plate having upper and lower regions. The upper region supports an engagement surface having an adhesive plane for securing to an object. The assembly also comprises a transport surface positioned within an opening in the lower region of the support plate, the transport surface for making primary contact with the floor for carrying a first portion of a load of an object during use; and an annular wiper having first and second annular ends to form a tapered annular arm. The first end is integrally connected to the support plate and the second annular end extends from the first annular end. The annular wiper repels and prevents debris from contacting and collecting on the transport surface.

Another example embodiment of the present disclosure comprises method for repelling or preventing the collection of debris at the base of an object, the method comprising the steps of: providing a support plate having upper and lower regions, the upper region supporting an engagement surface having an adhesive plane for securing to an object; positioning a transport surface within an opening in the lower region of the support plate, the transport surface for making primary contact with the floor for carrying a first portion of a load of an object during use; and integrally connecting by molding an annular wiper having first and second annular ends to form a tapered annular arm to the support plate, the second annular end extending from the first annular end, the annular wiper repelling and preventing debris from contacting and collecting on the transport surface.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Referring now to the figures generally wherein like numbered features shown therein refer to like elements throughout unless otherwise noted. The present disclosure relates to a repel assembly and method, and more particularly, a repel assembly and method that is secured to or near an attachment glider on an object to be moved preventing the collection of dirt, dust, and hair collectively or individually "debris" on the attachment glider.

Figure 1:
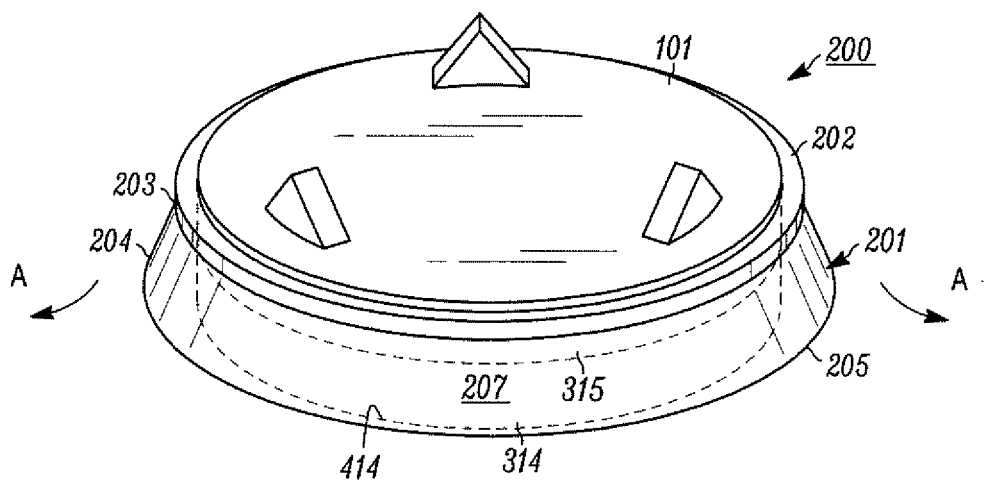
FIG. 1 is perspective view of a repel assembly secured to an attachment glider constructed in accordance with one example embodiment of the present disclosure.
Figure 1A:
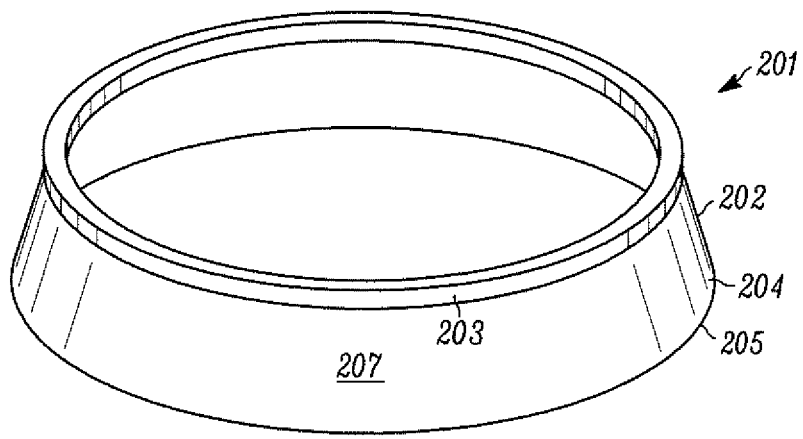
FIG. 1A is a perspective view of an annular ring constructed in accordance with one example embodiment of the present disclosure.
Figure 1B:
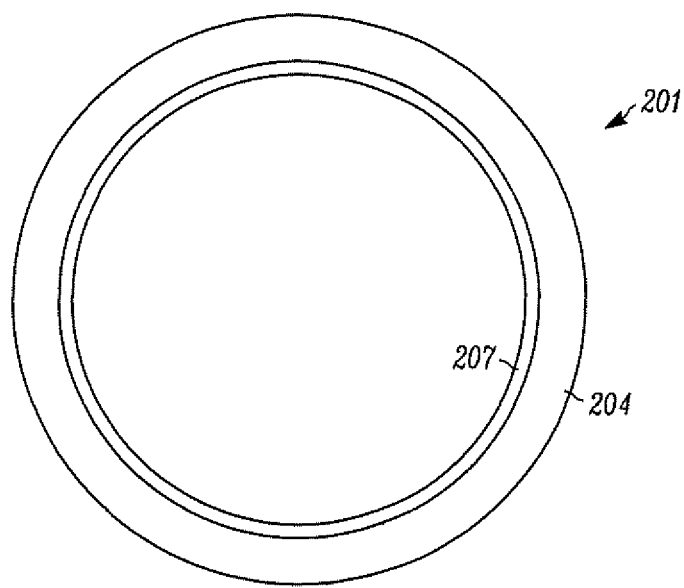
FIG. 1B is an upper plan view of the annular ring of FIG. 1A.
Figure 1C:
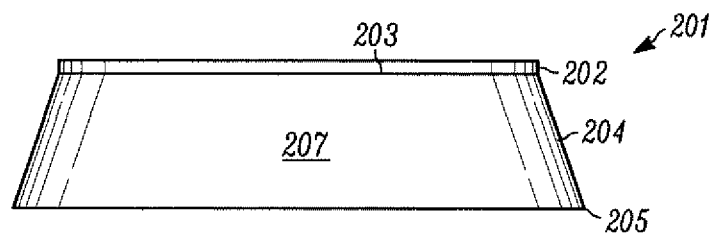
FIG. 1C is an elevation side view of the annular ring of FIG. 1A.
Figure 1D:
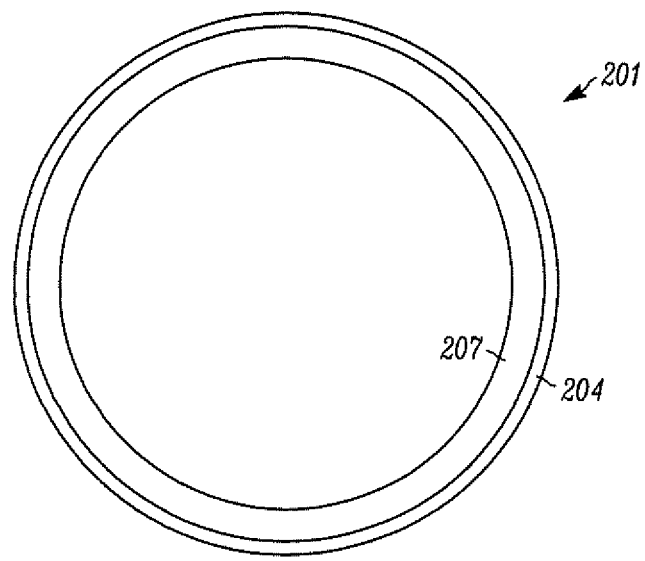
FIG. 1D is a bottom plan view of the annular ring of FIG. 1A.
Figure 2:
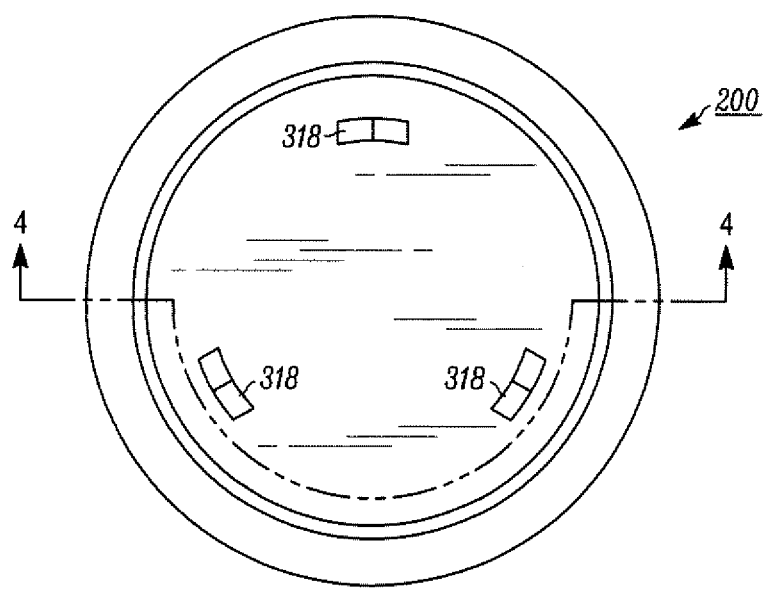
FIG. 2 is a top plan view of FIG. 1.
Figure 3:
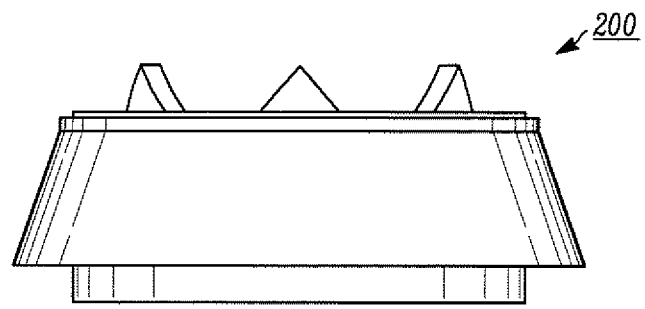
FIG. 3 is a side elevation view of FIG. 1.
Figure 4:
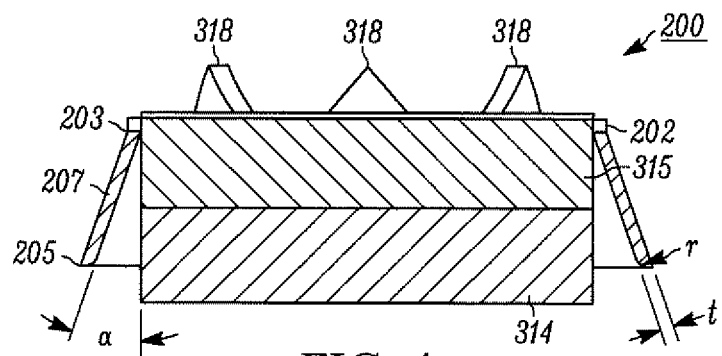
FIG. 4 is a section view of FIG. 2 along section lines 4-4.

FIG. 1 illustrates a perspective view of a repel assembly 200 constructed in accordance with one example embodiment of the present disclosure comprising and secured to an attachment glider 101. The repel assembly 200 also includes an annular ring 201 having an upper ring 202 and a lower ring 204, as further illustrated in the example embodiment of FIGS. 1A, 1B, 1C, and 1D. The annular ring 201 in the illustrated example embodiment is molded from a polymer material. In an alternative example embodiment, the polymer consists of at least one of polymer comprising plastic, polyethylene, polypropylene, an elastomer, rubber, or any combination thereof.

The lower ring 204 acts as a wiper having a first end 203 and a second end 205 spaced by an annular wiper body 207. The annular wiper body 207 diverges away from the first end 203 to the second end 205 at an angle α and defined by a substantially uniform annular thickness "t". In one example embodiment, the annular ring 201 is made from plastic and/or rubber and has a thickness "t" of approximate 0.063" inches, it relative thin thickness compared to the length of the wiper body 207 allowing for flexible in-and-out movement of the wiper body about the first end 203. In the illustrated example embodiment, the angle α is approximately ten degrees and the wiper body 207 includes a radial annular end "r" at the second end 205, facilitating its repelling features.

The upper ring 202 is of a constant diameter and molded with and to the lower ring 204. The upper ring's constant diameter includes an inner diameter 210 and outer diameter 212.

The repel assembly 200 further comprises an engagement surface 312 for attaching to an object such as furniture and transport surface 314 for contacting the floor on which the object is located. The repel assembly 200 is fixedly attached to form a secured connection to an object (not shown) such as a furniture leg through the combination of an adhesive bond 316 located on the engagement surface 312 and plurality of attachment spikes 318 fixed to the glider and projecting away from the engagement surface.

Figure 7:
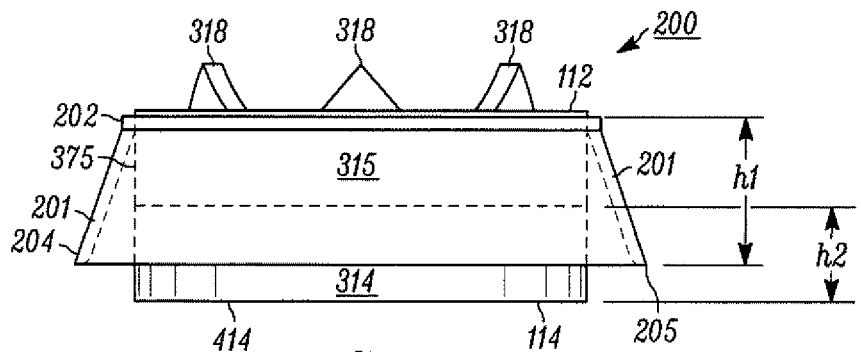
FIG. 7 is a side elevation view of FIG. 5.
Figure 8:
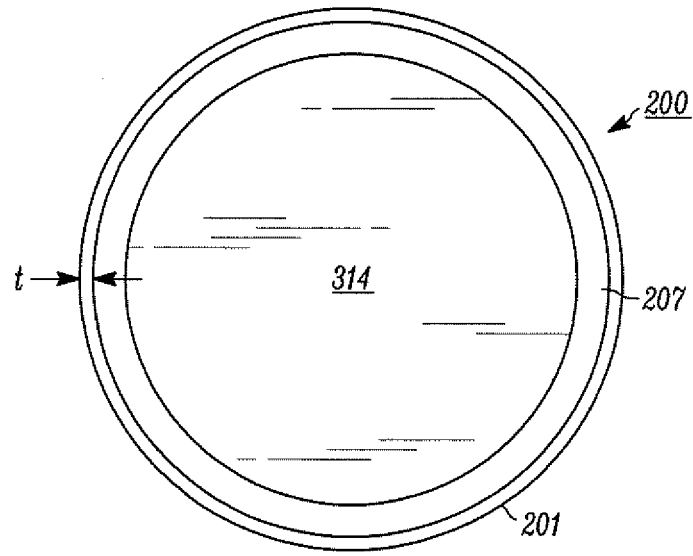
FIG. 8 is a bottom plan view of FIG. 5.

The transport surface 314 is located opposite the engagement surface 312 and designed to protect the floor from marring or damage during movement of the object across the surface of the floor. The annular ring 201 is designed to surround and envelop the transport surface 314 and prevent debris, such as dirt, dust, hair, and the like from collecting on thereon. In the illustrated example embodiment of FIG. 1, the annular ring 201 remains in constant contact with the floor and parallel with a contact end 414 of the transport surface 314. In addition, the annular ring 201 is designed to flex in the direction of arrows A (FIG. 1) outward as the wear occurs on the transport surface 314, reducing its height as illustrated in FIG. 7. Such flexing results in a constant or static wiper force being provided by the annular ring 201 independent of wear height or load to the transport surface 314.

In an alternative example embodiment, the wiper body 207 includes an altered material or an incorporation of a spring such that the constant or static wiper force is enhanced. The constant or static wiper force provided by the ring 201 and wiper body 207 in FIG. 1 allows the ring to wipe across the floor surface lightly while the transport surface (such as a felt pad) takes the load of the object it is connected to (such as a chair and human). This eliminates the collection of debris on the transport surface 314, as well prevents damage to the floor surface from the ring 201 or chair as the load is carried by the transport surface.

In the illustrated example embodiment, the engagement surface 312, transport surface 314, and annular ring 201 are circularly shaped, but could be constructed to include any geometrical shape to match the geometry portion of the object in which the glider is secured without departing from the spirit and scope of the present disclosure.

Figure 5:
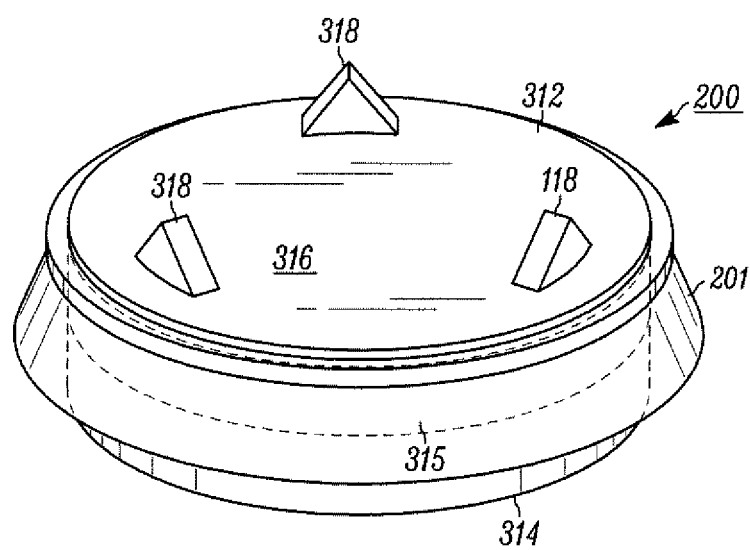
FIG. 5 is a perspective view of a repel assembly constructed in accordance with another example embodiment of the present disclosure.
Figure 6:
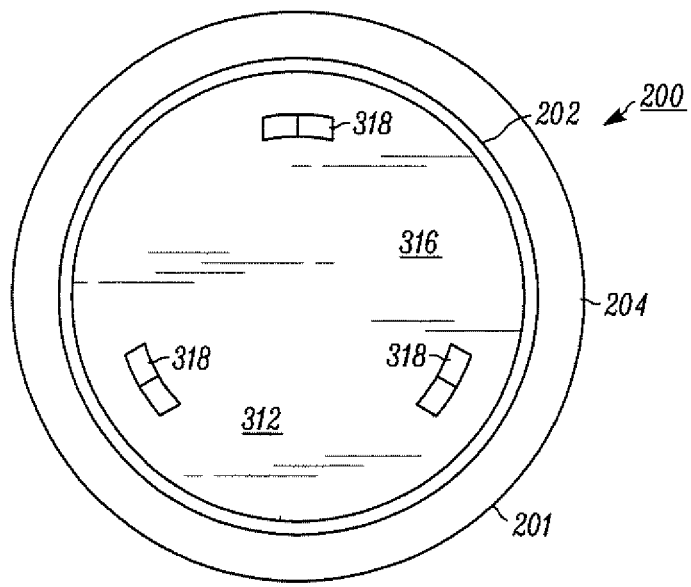
FIG. 6 is a top plan view of FIG. 5.
Figure 9:
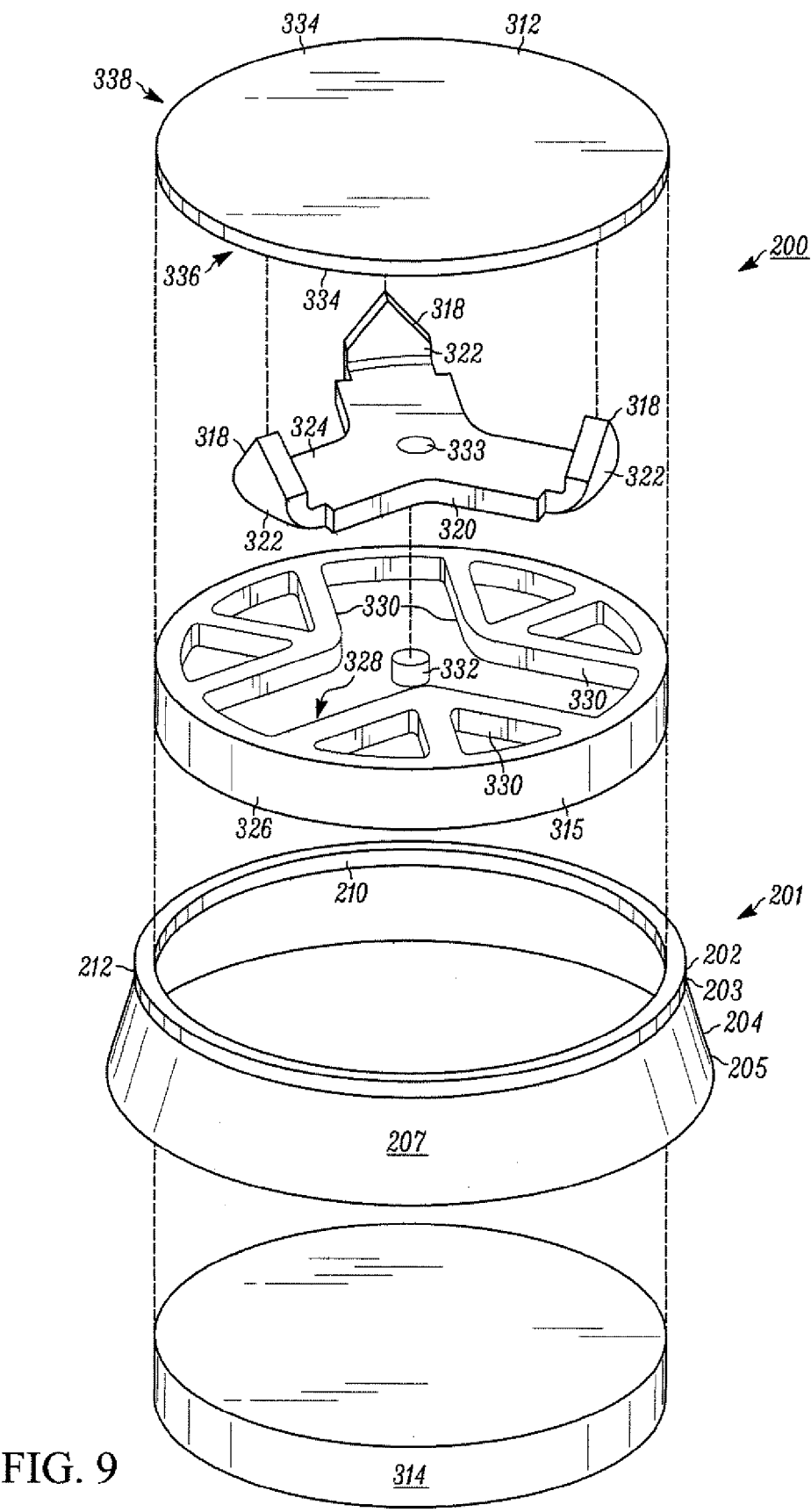
FIG. 9 is an exploded perspective view of FIG. 5.

Illustrated in FIGS. 6-9, are the top plan, side elevation, and bottom plan views of the example embodiment of FIG. 5. FIG. 9 illustrates an exploded perspective view of the example embodiment of FIG. 5. In particular, the engagement surface 312 and transport surface 314 are separated by an intermediate surface 315. The intermediate surface 315 supports a metal fixture 320 having a plurality of transversely curved ends 322 extending from a relatively planer body 324. The transversely curved ends 322 support a respective one of the plurality of attachment spikes 318.

In one example embodiment, the intermediate surface 315 is a circular disc having a radial wall 326 supporting a cavity region 328. The cavity region 328 includes a number of support walls 330 for retaining the metal fixture 320 and to advantageously prevent the metal fixture from rotating or moving within the cavity during use. The number support walls 330 correspond to the number of curved ends 322. The cavity 328 further comprises an alignment projection 332 for guiding the metal fixture 320 having a corresponding opening 333 into the cavity during assembly.

Once the metal fixture 320 is seated into the cavity 328, the engagement surface 312 is positioned over the metal fixture and secured to the intermediate surface 315. That is, the engagement surface 312 comprises a double-sided adhesive plane 334, allowing for adhesive bonding to both an assembly side 336 and engagement side 338 of the engagement surface.

In the illustrated example embodiment, the engagement surface 312 is approximately 1/32" of one-inch thick and both sides 336, 338 include a protective sheet to cover the adhesive surface that is removed upon assembly or attachment to the object.

In addition to the adhesive bond, the plurality of attachment spikes 318 penetrate the engagement surface 312 during assembly. This penetration assists in the securing of the engagement surface 312 to the intermediate surface 315. The intermediate surface 315 is secured to the transport surface 114 by an adhesive, such as glue positioned and cured between the surfaces. In an alternative example embodiment, another engagement surface 312 is positioned between for securing the intermediate surface 315 to the transport surface 314.

In the illustrated example embodiment, the transport surface 314 is a soft textile material, such as felt approximately 1/8" of one inch in thickness and the metal fixture 320 is formed from 1020 steel. The intermediate surface 315 is molded from a relatively hard thermoplastic. In the illustrated example embodiment of FIGS. 1-9, the repel assembly 200 is particularly suitable for non-carpet floors, such as wood, laminate, vinyl, tile, and the like.

The plurality of attachment spikes 318 protrude from the attachment surface 312 approximately 1/16" of one inch and include a total of three located equally at 120 degrees from each other. This allows for securing to the object for transport, such as a wooden leg of furniture without the need of a hammer or tools. While the penetration of the spikes 318 are advantageously designed in size and configuration to eliminate the need for tools, the spikes' 318 design and configuration in combination with the adhesive bond of the adhesive plane 334 provide sufficient strength to resist separation after attachment, shear stresses, or failure during transport of the object.

In the illustrated example embodiment, the annular ring 201 is secured to the outer diameter 375 of the intermediate surface 315 by a press-fit connection with the inner diameter 210 of the upper ring 202. In alternative example embodiment, an adhesive such as glue is used to further secure the upper ring 202 to the intermediate surface 315. In yet another example embodiment, the annular ring 201, and particularly the upper ring 202 is molded into and with the intermediate surface 315.

The flexible in-and-out movement of the wiper body 207 about the first end 203 advantageously prevents collection of dirt, dust, hair, and debris from collecting to the transport surface 314. Such debris is more difficult to clean than if the debris was alone on the surface of the floor. In the illustrated example embodiment, the second end of the 205 of the annular ring 201 contacts the floor at the same point as the compressed transport surface 314. Stated another way, the location of the annular ring 201 about the intermediate surface 315 is such that the second end 205 defined by h1 terminates at the contact end 414 when compressed by the weight of the object or furniture defined by h2 as illustrated in FIG. 7. Therefore, under compression, the transport surface's 314 stack-up once assembled results in the substantial alignment of the contact end 414 with the second end 205 of the annular ring 201. This prevents the collection or contact of debris with the transport surface 314.

In the illustrated example embodiment, annular ring 201 is attached by inner ring 210 or is molded with the intermediate surface 315. In another example embodiment, the annular ring 201 is attached to the object or furniture leg covering the attachment glider and its second end 205 terminates at the contact end 414 when compressed by the weight of the object or furniture.

Figure 10:
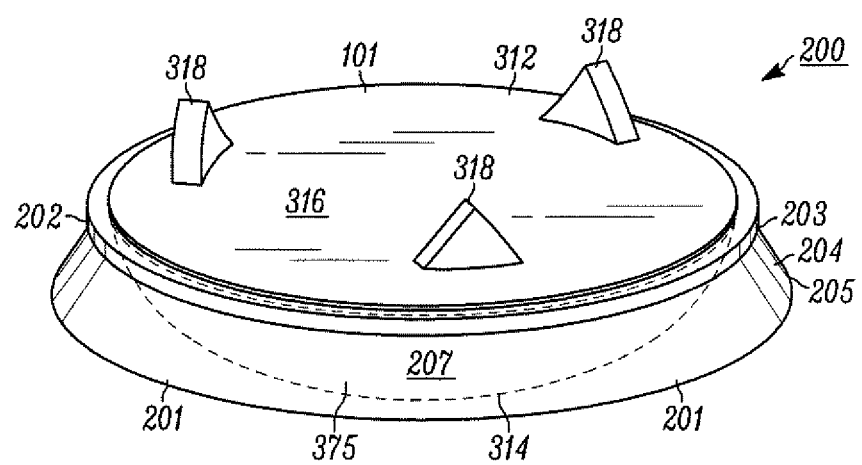
FIG. 10 is a perspective view of a repel assembly constructed in accordance with another example embodiment of the present disclosure.

FIG. 10 illustrates a perspective view of a repel assembly 200 constructed in accordance with another example embodiment of the present disclosure secured to an attachment glider 101. The repel assembly 200 includes an annular ring 201 having an upper ring 202 and a lower ring 204.

The lower ring 204 acts as a wiper having a first end 203 and a second end 205 spaced by an annular wiper body 207. The annular wiper body 207 diverges away from the first end 203 to the second end 205 at an angle α and defined by a substantially uniform annular thickness "t". In one example embodiment, the annular ring 201 is made from plastic and/or rubber and has a thickness "t" of approximate 0.063" inches, allowing for flexible in-and-out movement of the wiper body 207 about the first end 203. In the illustrated example embodiment, the angle α is approximately ten degrees.

The upper ring 202 is of a constant diameter and molded with and to the lower ring 204. The upper ring's constant diameter includes an inner diameter 210 and outer diameter 212.

The repel assembly 200 further comprises an engagement surface 312 for attaching to an object such as furniture and transport surface or support surface 314 for contacting the floor on which the object is located. The repel assembly 200 is fixedly attached to form a secured connection to an object (not shown) such as a furniture leg through the combination of an adhesive bond 316 located on the engagement surface 312 and plurality of attachment spikes 318 fixed to the glider and projecting away from the engagement surface.

The transport surface 314 is located opposite the engagement surface 312 and designed to protect the floor from marring or damage during movement of the object across the surface of the floor. In the illustrated example embodiment, the engagement surface 312, transport surface 314, and annular ring 201 are circularly shaped, but could be constructed to include any geometrical shape to match the geometry portion of the object in which the glider is secured without departing from the spirit and scope of the present disclosure.

Figure 11:
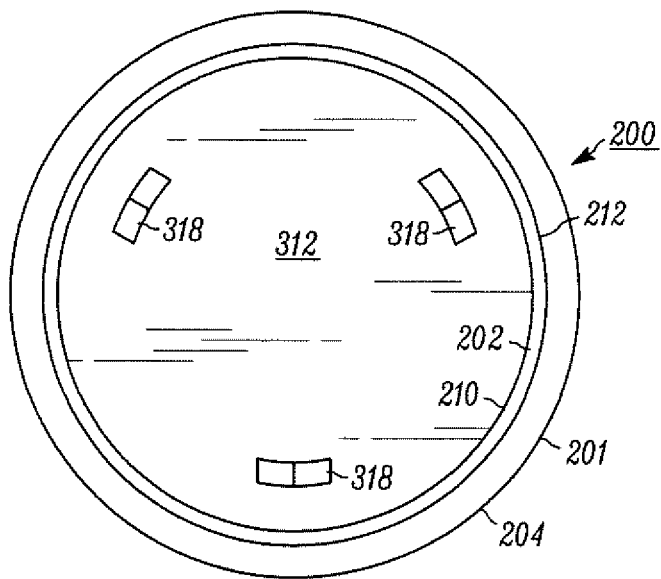
FIG. 11 is a top plan view of FIG. 10.
Figure 12:
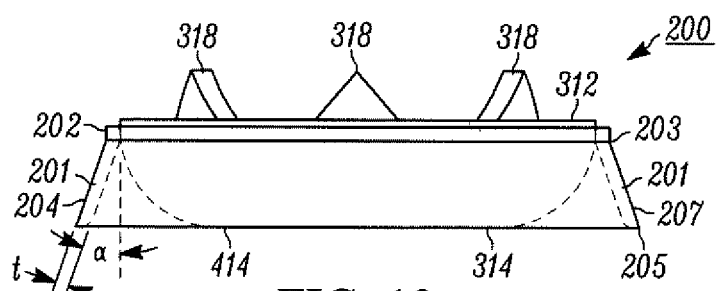
FIG. 12 is a side elevation view of FIG. 10.
Figure 13:
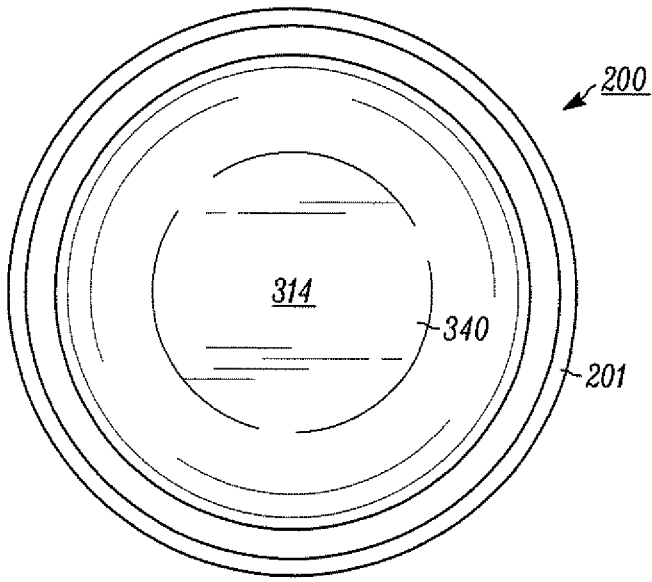
FIG. 13 is a bottom plan view of FIG. 10.
Figure 14:
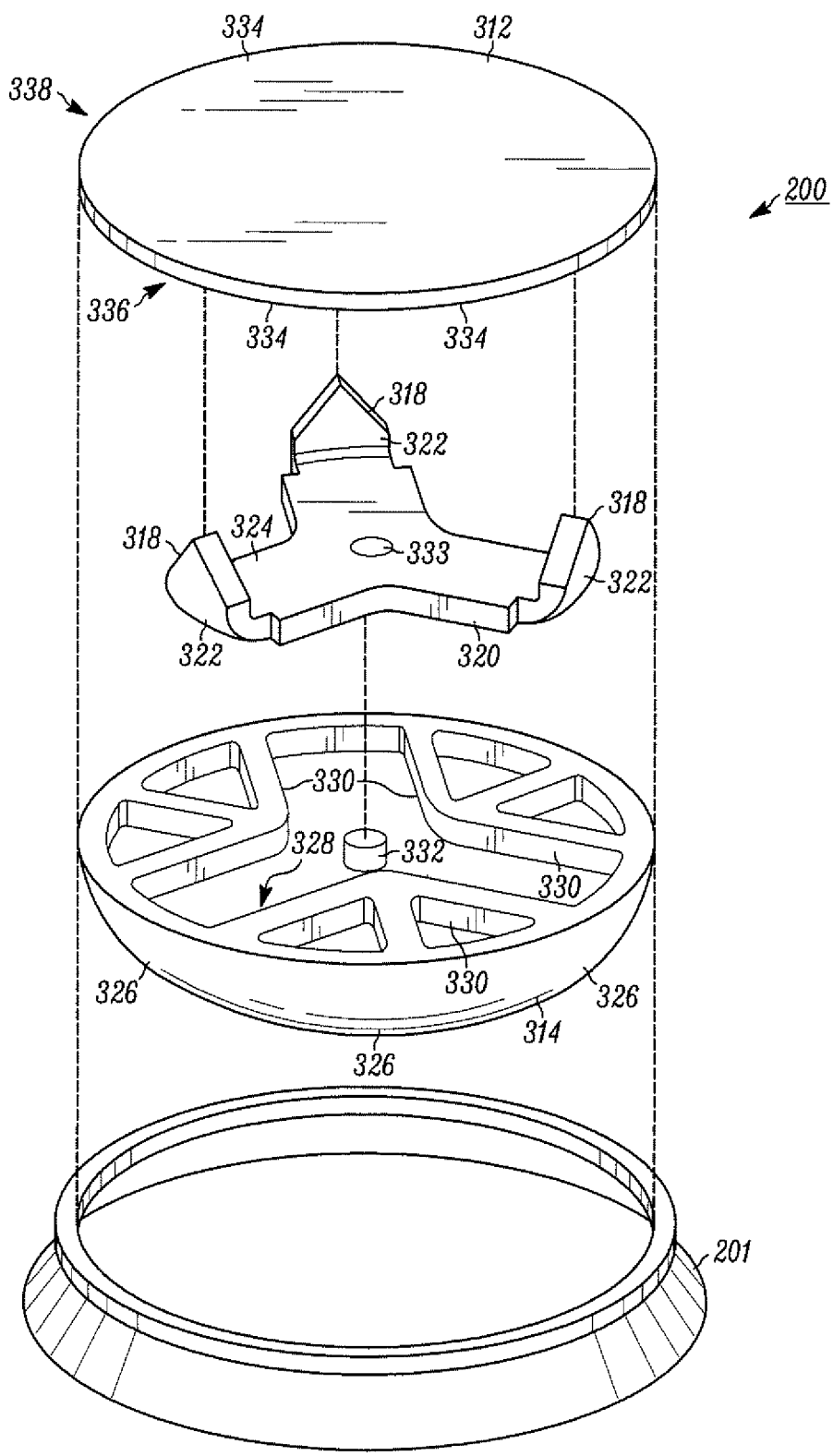
FIG. 14 is an exploded perspective view of FIG. 14.

Illustrated in FIGS. 11-13, are the top plan, side elevation, and bottom plan views of the example embodiment of FIG. 10. FIG. 14 illustrates an exploded perspective view of the example embodiment of FIG. 10. In particular, the transport surface 314 supports a metal fixture 320 having a plurality of transversely curved ends 322 extending from a relatively planer body 324. The transversely curved ends 322 support a respective one of the plurality of attachment spikes 318.

In one example embodiment, the transport surface 314 is a circular cup having an upwardly curved radial wall 326 supporting a cavity region 328. The cavity region 328 includes a number of support walls 330 for retaining the metal fixture 320 and to advantageously prevent the metal fixture from rotating or moving within the cavity during use. The number support walls 330 correspond to the number of curved ends 322. The cavity 328 further comprises an alignment projection 332 for guiding the metal fixture 320 having a corresponding opening 333 into the cavity during assembly.

Once the metal fixture 320 is seated into the cavity 328, the engagement surface 312 is positioned over the metal fixture and secured to the transport surface 314. That is, the engagement surface 312 comprises a double-sided adhesive plane 334, allowing for adhesive bonding to both an assembly side 336 and engagement side 338 of the engagement surface. In the illustrated example embodiment, the engagement surface is approximately 1/32" of one-inch thick and both sides 336, 338 include a protective sheet to cover the adhesive surface that is removed upon assembly or attachment to the object.

In addition to the adhesive bond, the plurality of attachment spikes penetrate the engagement surface 312 during assembly. This penetration assists in the securing of the engagement surface 312 to the transport surface 314.

In the illustrated example embodiment, the transport surface 314 is molded from a thermoplastic of relatively hard properties and the metal fixture 320 is formed from 1020 steel. The transport surface 314 further comprises a contact area 340 for engaging the floor that has a relatively smooth low friction surface advantageous for efficient transport of the object across a floor. In the illustrated example embodiment of FIGS. 10-14, the repel assembly 200 is particularly suitable for carpet floors.

The plurality of attachment spikes 318 protrude from the attachment surface 312 approximately 1/16" of one inch and include a total of three located equally at 120 degrees from each other. This allows for securing to the object for transport, such as a wooden leg of furniture without the need of a hammer or tools. While the penetration of the spikes 318 are advantageously designed in size and configuration to eliminate the need for tools, the spikes' 318 design and configuration in combination with the adhesive bond of the adhesive plane 334 provide sufficient strength to resist separation after attachment, shear stresses, or failure during transport of the object.

In the illustrated example embodiment of FIGS. 10-14, the annular ring 201 is secured to the outer diameter 375 of the transfer surface 314 by a press-fit connection with the inner diameter 210 of the upper ring 202. In alternative example embodiment, an adhesive such as glue is used to further secure the upper ring 202 to the transfer surface 314. In yet another example embodiment, the annular ring 201, and particularly the upper ring 202 is molded into and with the transfer surface 314.

The flexible in-and-out movement of the wiper body 207 about the first end 203 advantageously prevents collection of dirt, dust, hair, and debris from collecting to or near the transport surface 314. Such debris is more difficult to clean than if the debris was alone on the surface of the floor. In the illustrated example embodiment, the second end of the 205 of the annular ring 201 contacts the floor at the same point as the transport surface 314. Stated another way, the location of the annular ring 201 about the transport surface 314 is such that the second end 205 terminates at the contact end 414 as illustrated in FIG. 12.

In the illustrated example embodiment, annular ring 201 is attached by inner ring 210 or is molded with the transfer surface 314. In another example embodiment, the annular ring 201 is attached to the object or furniture leg covering the attachment glider and its second end 205 terminates at the contact end 414.

FIGS. 15-21 illustrate a perspective view of a repel assembly 500 constructed in accordance with another example embodiment of the present disclosure. The repel assembly 500 includes a dynamic wear system 590 that allows the transport surface to remain in primary contact with the floor based on the load provided by the object resting upon the assembly, while a lesser, secondary load is applied to an annular wiper that prevents debris from collecting on transport surface. The dynamic wear system 590 in addition, prevents the repel assembly from marking the floor while also facilitating the annular wiper's ability to prevent the collection of dust or debris on the transport surface during use. The repel assembly 500 includes an annular wiper 502, cushion 504, transport surface 506, support plate 508, plurality of spikes 510, and engagement surface 512.

The annular wiper 502 and support plate 508 are made from plastic. The annular wiper 502 engages the floor with a secondary load 503 while in contact with the floor, allowing it to act as a dust cover, repelling debris from attracting to the transport surface 506.

The repel assembly's 500 engagement surface 512 includes a plurality of spikes 514 for attaching to an object such as furniture, or the bottom of a leg, chair, ottoman, dresser, and the like. That is, the repel assembly 500 is fixedly attached to form a secured connection to an object (not shown) such as a furniture leg through the combination of an adhesive bond 516 located on the engagement surface 512 and plurality of attachment spikes 514 fixed to the support plate 508 and projecting away from the engagement surface.

The transport surface 506 in the illustrated example embodiment is made from a cushion-like material, such as foam or felt that contacts the floor on which the object is located. The transport surface 506 is located below the support plate 508, which advances the transport surface under a primary load 501 carried by the object out of an opening 534. Since the primary load 501 by the object is greater than the secondary load 503 applied to the annular wiper 502, marking or scratching of the floor is avoided. This prevention of scratches or marks on the floor and is achieved by the repel assembly's dynamic wear system 590.

In the illustrated example embodiment, the engagement surface 512, transport surface 506, support plate 508, cushion 504, and annular wiper 502 are circularly shaped, but could be constructed to include any geometrical shape to match the geometry profile of the object in which the repel assembly 500 is secured without departing from the spirit and scope of the present disclosure.

Figure 15:
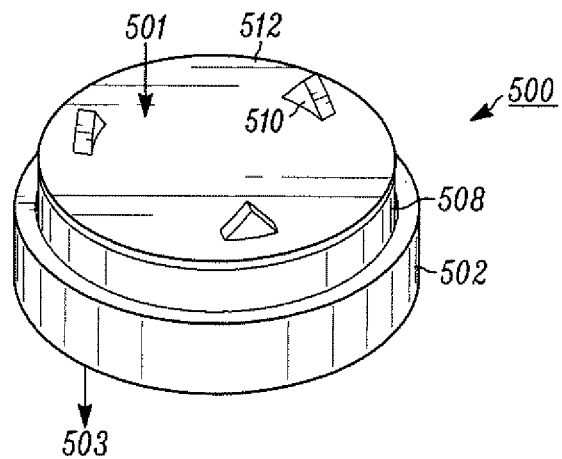
FIG. 15 is an upper perspective view of a repel assembly constructed in accordance with another example embodiment of the present disclosure.
Figure 16:
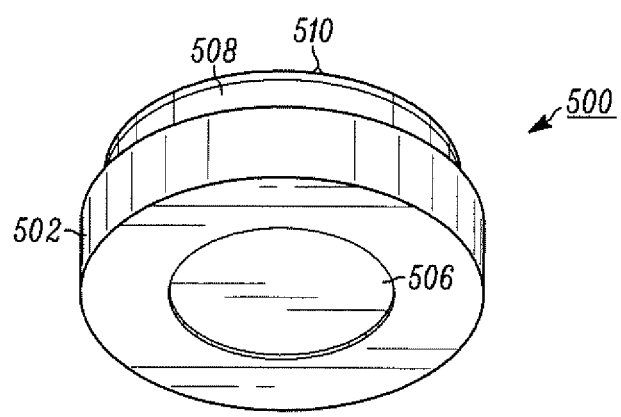
FIG. 16 is a lower perspective view of FIG. 15.
Figure 17:
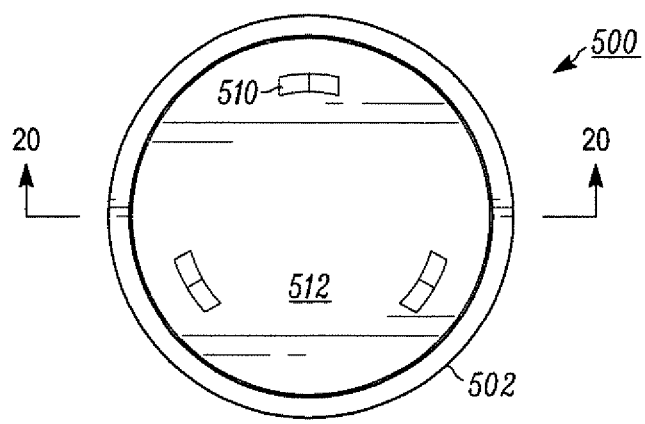
FIG. 17 is a top plan view of FIG. 15.
Figure 18:
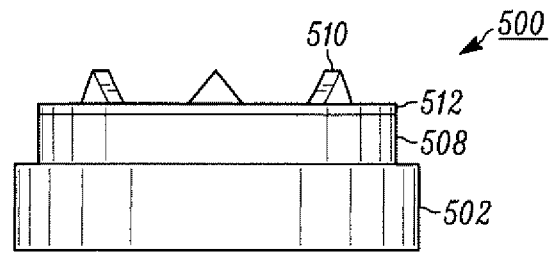
FIG. 18 is a side elevation view of FIG. 15.
Figure 19:
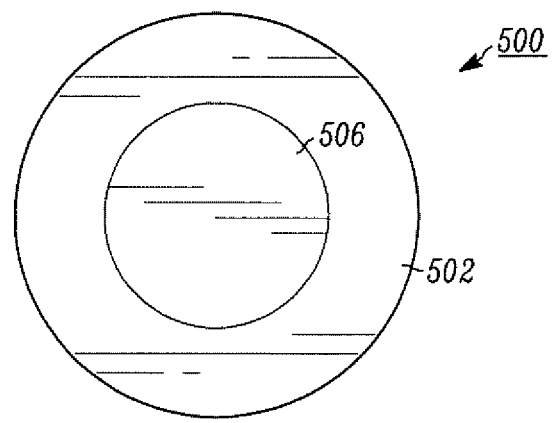
FIG. 19 is a bottom plan view of FIG. 15.
Figure 20:
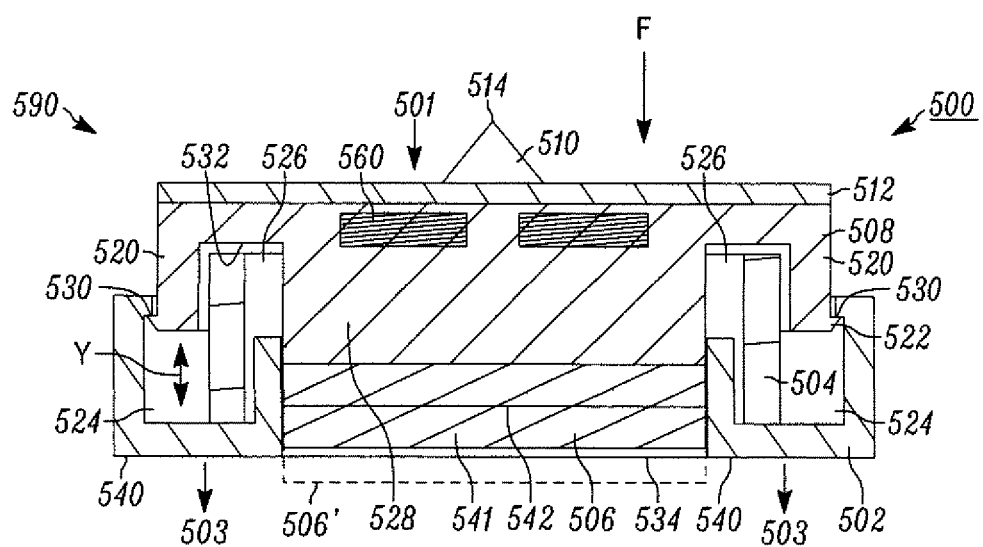
FIG. 20 is a section view of FIG. 17 along section lines 20-20.
Figure 21:
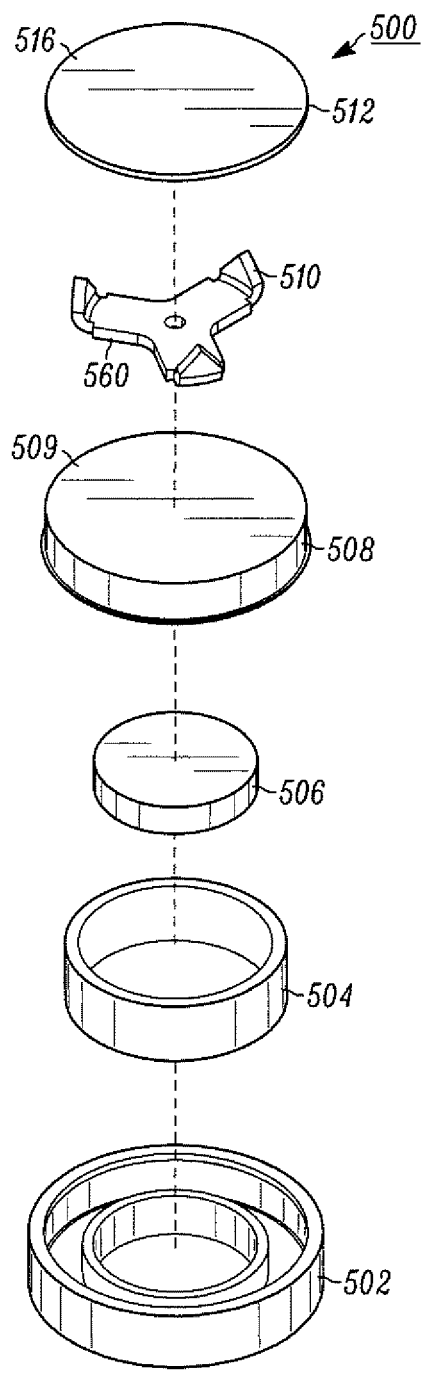
FIG. 21 is an exploded perspective view of FIG. 15.

Illustrated in FIGS. 17-19, are the top, side elevation, and bottom plan views of the example embodiment of FIG. 15. FIG. 21 illustrates an exploded perspective view of the example embodiment of FIG. 15. In the illustrated example embodiment, except for the metal spikes 510, transport surface 506, cushion 504, and adhesive 516, the entire assembly is formed from plastic. The cushion 504, provides the reduced or secondary load absorbed from the object and transmitted to the annular wiper 502, and in the illustrated example embodiment, the cushion 504 is made from ethylene vinyl acetate (EVA) material. The cushion 504 however, could be made from other compressible materials, such as a metal spring or other materials having similar properties without departing from the spirit and scope of the present disclosure. In one example embodiment, the transport surface 506 is felt, a polymer such as polyethylene or polypropylene, or foam material, capable of preventing marring or marking of the floor during use.

A metal fixture 560 forming the plurality of attachment spikes 510 is seated into a form or fixture (not shown) in the top of the support plate 508. The engagement surface 512 comprises the double-sided adhesive 516, allowing for adhesive bonding to both the object (not shown) and repel assembly 500. In the illustrated example embodiment, the engagement surface 512 is approximately 1/32" of one-inch thick and the upper side includes a protective sheet to cover the adhesive surface that is removed upon assembly or attachment to the object.

In addition to the adhesive bond, the plurality of attachment spikes penetrate the engagement surface 512 during assembly. This penetration assists in the securing of the engagement surface 512 to the object.

The plurality of attachment spikes 514 protrude from the attachment surface 512 approximately 1/16" of one inch and include a total of three located equally at 120 degrees from each other. This allows for securing to the object for transport, such as a wooden leg of furniture without the need of a hammer or tools. While the penetration of the spikes 514 are advantageously designed in size and configuration to eliminate the need for tools, the spikes' 514 design and configuration in combination with the adhesive bond of the engagement surface 512 provide sufficient strength to resist separation after attachment, shear stresses, or failure during transport of the object.

In the illustrated example embodiment of FIGS. 15-21, the adhesive engagement surface 512 and metal fixture 560 are secured to the upper side 509 of the support plate 508. The support plate 508 is moveably secured (in the direction of arrows Y in FIG. 20) to the annular wiper 502 through an annular arm 520 that includes an annular catch 522 that rides in an annular channel 524 of the annular wiper. A circular cavity 526 is provided between the annular arm 520 and a diametrical center post 528 fowled in the support plate 508.

Because the support plate 508 and annular wiper 502 are made of plastic, the annular arm 520 and wiper elastically deform as the arms snap into the channel 524 during assembly. The annular arms 520 hold the support plate 508 into position by an annular abutment 530 of the wiper 502 surrounding the channel and engaging the annular catch 522 extending from the arms. An underside rim 532 of the support plate 508 rides on the cushion 504. The dynamic wear system 590 formed in part by the channel 524, cushion 504, circular cavity 526, and arm 520 allow for the vertical movement or translation of the annular wiper 508 independently from the transport surface 506, as indicated by arrows Y.

During use, the primary load 501 generated by the weight of the object acting down on the repel assembly 500 (as indicated by the arrow F in FIG. 20) causes the downward movement or translation of the support plate 508 as described above, and accordingly, the movement of the support plate diametrical center post 528. The center post 528 thereby engages in its entirety and substantially uniformly, the transport surface 506, thus advancing the transport surface (506' shown in phantom) out of an opening 534 in the bottom of the annular wiper 502. The lesser, secondary load 503 originated by the object is reduced and absorbed by the cushion 504 before being applied to the annular wiper 502. This prevents the annular wiper from marring or marking the floor, yet remain in contact with the floor to prevent dust and debris from collecting on the transport surface 506.

The dual loading nature of the primary load 501 and secondary load 503 of the dynamic wear system 590, advantageously prevents collection of dirt, dust, hair, and debris from collecting to or near the transport surface 506, while preventing the floor from being damaged over time even as the material 541 wears away from the transport surface. Stated another way, the repel assembly 500 includes the dynamic wear system 590 that allows the transport surface to remain in primary contact with the floor under the greatest load over time, while the annular wiper 502 remains at a safe cleaning contact load with the floor that does not allow for marking or scratches, but keeps the transport surface safe from debris. In another example embodiment, the transport surface 506 includes a wear indicator 542 that informs the user that the amount of material worn from the bottom of the transport surface is no longer sufficient to provide protection to the floor.

FIGS. 22-28 illustrate a perspective view of a repel assembly 600 constructed in accordance with another example embodiment of the present disclosure. The repel assembly 600 includes a dynamic wear system 690 that allows the transport surface to remain in primary contact with the floor based on the load provided by the object resting upon the assembly, while a lesser, secondary load is applied to an annular wiper that prevents debris from collecting on transport surface. The dynamic wear system 590 in addition, prevents the repel assembly from marking the floor while also facilitating the annular wiper's ability to prevent the collection of dust or debris on the transport surface during use. The repel assembly 600 includes an annular wiper 602, transport surface 606, support plate 608, plurality of spikes 610, and engagement surface 612.

The annular wiper 602 and support plate 608 are made from plastic. The annular wiper 602 engages the floor with a secondary load 603 while in contact with the floor, allowing it to act as a dust cover, repelling debris from attracting to the transport surface 606.

The repel assembly's 600 engagement surface 612 includes a plurality of spikes 614 for attaching to an object such as furniture, or the bottom of a leg, chair, ottoman, dresser, and the like. That is, the repel assembly 600 is fixedly attached to form a secured connection to an object (not shown) such as a furniture leg through the combination of an adhesive bond 616 located on the engagement surface 612 and plurality of attachment spikes 614 fixed to the support plate 608 and projecting away from the engagement surface.

The transport surface 606 in the illustrated example embodiment is made from a cushion-like material, such as foam or felt that contacts the floor on which the object is located. The transport surface 606 is located below the support plate 608, which advances the transport surface under a primary load 601 carried by the object out of an opening 634. Since the primary load 601 by the object is greater than the secondary load 603 applied to the annular wiper 602, marking or scratching of the floor is avoided. This prevention of scratches or marks on the floor and is achieved by the repel assembly's dynamic wear system 690.

In the illustrated example embodiment, the engagement surface 612, transport surface 606, support plate 608, and annular wiper 602 are circularly shaped, but could be constructed to include any geometrical shape to match the geometry profile of the object in which the repel assembly 600 is secured without departing from the spirit and scope of the present disclosure.

Figure 22:
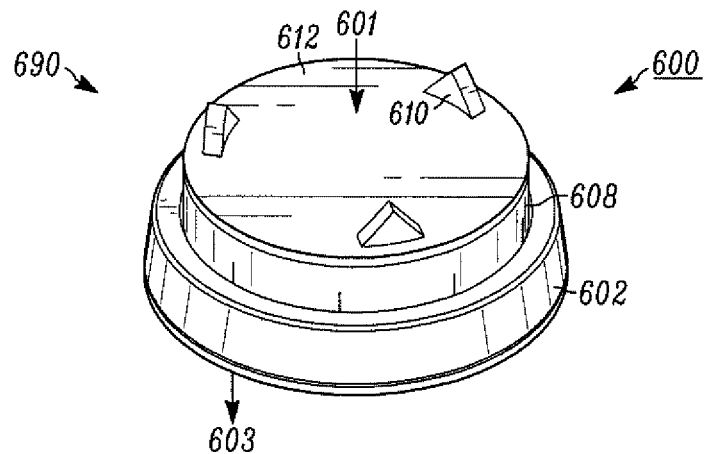
FIG. 22 is an upper perspective view of a repel assembly constructed in accordance with another example embodiment of the present disclosure.
Figure 23:
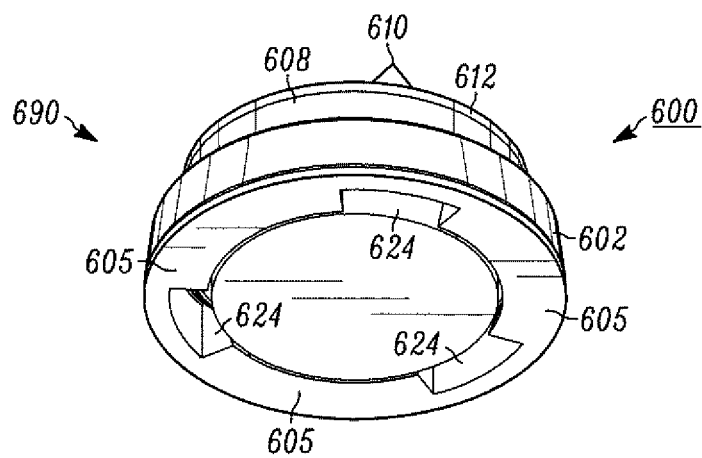
FIG. 23 is a lower perspective view of FIG. 22.
Figure 24:
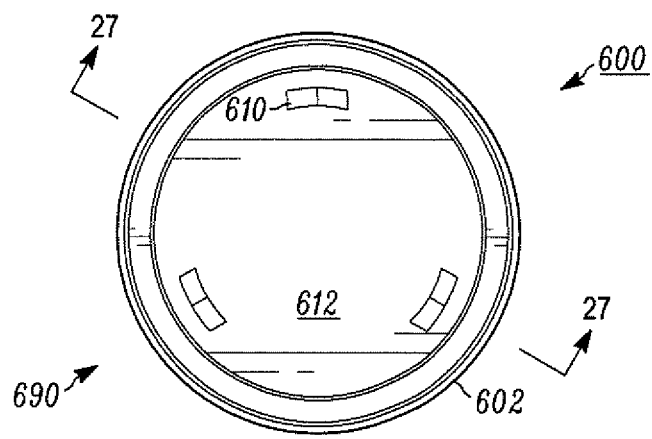
FIG. 24 is a top plan view of FIG. 22.
Figure 25:
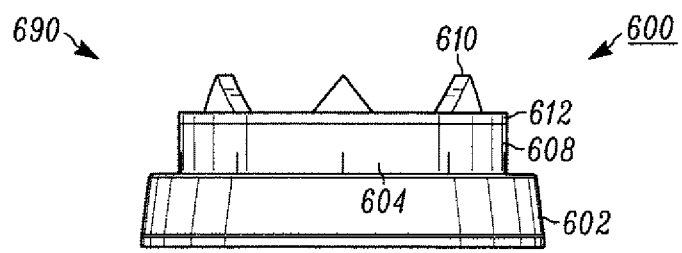
FIG. 25 is a side elevation view of FIG. 22.
Figure 26:
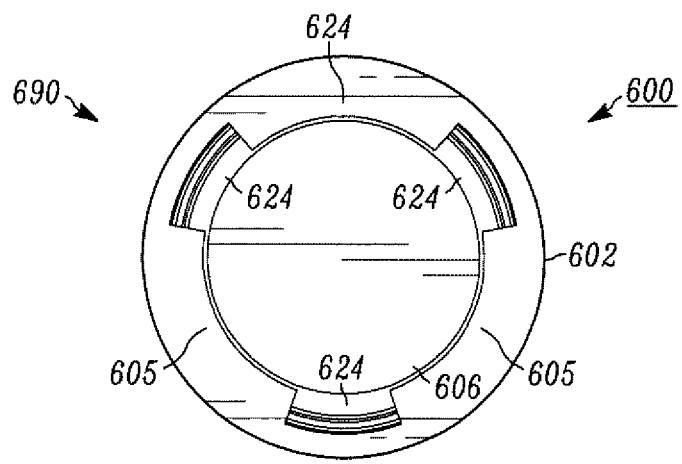
FIG. 26 is a bottom plan view of FIG. 22.
Figure 27:
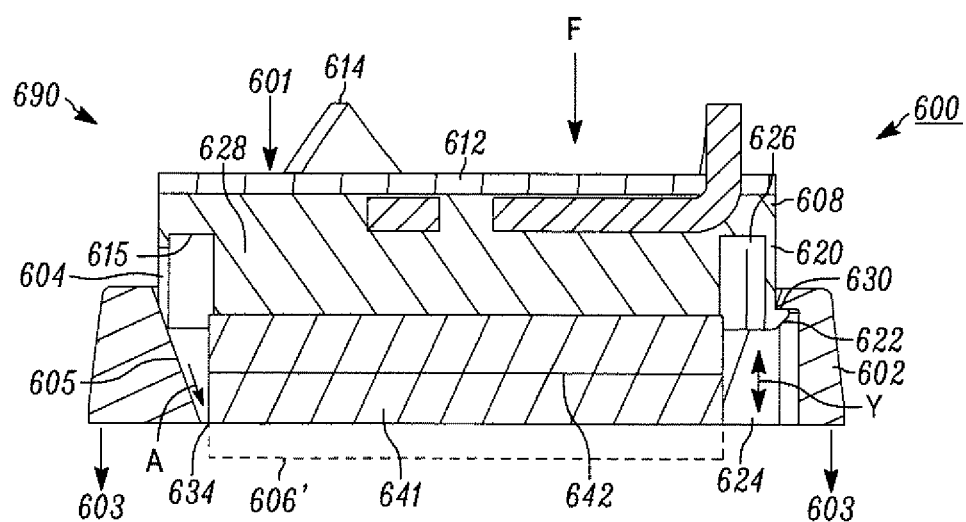
FIG. 27 is a section view of FIG. 24 along section lines 27-27.
Figure 28:
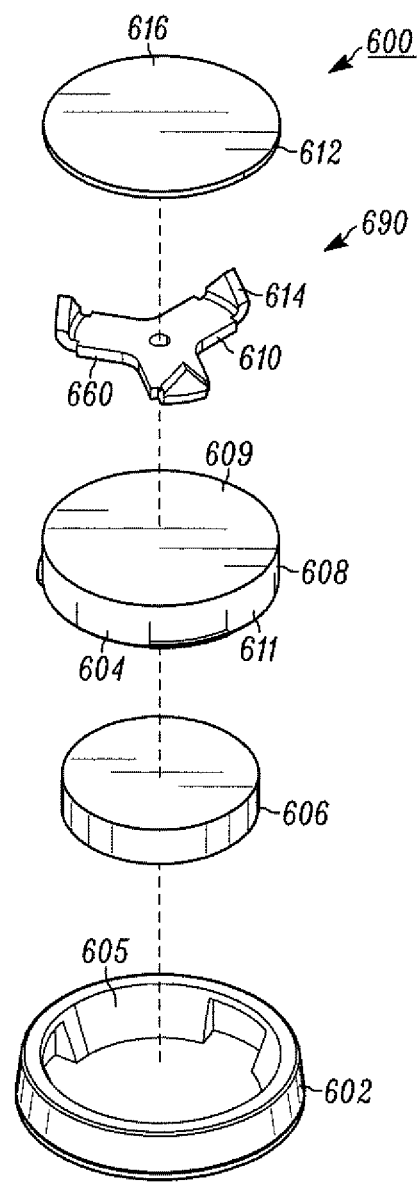
FIG. 28 is an exploded perspective view of FIG. 22.

Illustrated in FIGS. 24-26, are the top, side elevation, and bottom plan views of the example embodiment of FIG. 22. FIG. 27 illustrates an exploded perspective view of the example embodiment of FIG. 22. In the illustrated example embodiment, except for the metal spikes 610, transport surface 606, and adhesive 616, the entire assembly 600 is formed from plastic. In one example embodiment, the transport surface 606 is felt, a polymer such as polyethylene or polypropylene, or foam material, capable of preventing marring or marking of the floor during use.

A metal fixture 660 forming the plurality of attachment spikes 610 is seated into a form or fixture (not shown) in the top of the support plate 608. The engagement surface 612 comprises the double-sided adhesive 616, allowing for adhesive bonding to both the object (not shown) and repel assembly 600. In the illustrated example embodiment, the engagement surface 612 is approximately $\frac{1}{32}$" of one-inch thick and the upper side includes a protective sheet to cover the adhesive surface that is removed upon assembly or attachment to the object.

In addition to the adhesive bond, the plurality of attachment spikes penetrate the engagement surface 612 during assembly. This penetration assists in the securing of the engagement surface 612 to the object.

The plurality of attachment spikes 614 protrude from the attachment surface 612 approximately $\frac{1}{16}$" of one inch and include a total of three located equally at 120 degrees from each other. This allows for securing to the object for transport, such as a wooden leg of furniture without the need of a hammer or tools. While the penetration of the spikes 614 are advantageously designed in size and configuration to eliminate the need for tools, the spikes' 614 design and configuration in combination with the adhesive bond of the engagement surface 612 provide sufficient strength to resist separation after attachment, shear stresses, or failure during transport of the object.

In the illustrated example embodiment of FIGS. 22-28, the adhesive engagement surface 612 and metal fixture 660 are secured to the upper side 609 of the support plate 608. The support plate 608 is moveably secured (in the direction of arrows Y in FIG. 27) to the annular wiper 602 through a plurality of annular arms 620 (three in the example embodiment) that each include an annular catch 622 that rides in an annular channel 624 of the annular wiper. A circular cavity 626 is provided between the annular arm 620 and a diametrical center post 628 formed in the support plate 608.

Because the support plate 608 and annular wiper 602 are made of plastic, the annular arms 620 and wiper elastically deform as the arms snap into the channel 624 during assembly. The annular arms 620 hold the support plate 608 into position by an annular abutment 630 of the wiper 602 surrounding the channel 624 and engaging the annular catch 622 extending from the arms.

The dynamic wear system 690 formed in part by the channel 624, wings 604, wedges 605, circular cavity 626, and arm 620 allow for the vertical movement or translation of the support plate 608 and transport surface 606, as indicated by arrows Y. The wings 604 of the support plate 608 are formed by serrations 611 along the perimeter of the support plate. The wings 604 are molded into and extend linearly from the bottom surface 615 of top of the support plate 608 as illustrated in FIG. 27. The wings 604 engage corresponding wedges 605 in the base of the annular wiper 602. The wings over time fold inward in the direction of the wedges 605 moving downward in the direction of arrow A of FIG. 27.

During use, the primary load 601 generated by the weight of the object acting down on the repel assembly 600 (as indicated by the arrow F in FIG. 27) causes the downward movement or translation of the support plate 608 and its wings 604 on the wedges 605 as described above, and accordingly, the movement of the support plate diametrical center post 628. The center post 628 thereby engages in its entirety and substantially uniformly, the transport surface 606, thus advancing the transport surface (606' shown in phantom) out of an opening 634 in the bottom of the annular wiper 602. The lesser, secondary load 603 originated by the object is reduced and absorbed by the wings 604 before being applied to the annular wiper 602. This prevents the annular wiper 602 from marring or marking the floor, yet it remains in contact with the floor to prevent dust and debris from collecting on the transport surface 606.

The dual loading nature of the primary load 601 and secondary load 603 of the dynamic wear system 690, advantageously prevents collection of dirt, dust, hair, and debris from collecting to or near the transport surface 606, while preventing the floor from being damaged over time even as the material 641 wears away from the transport surface. Stated another way, the repel assembly 600 includes the dynamic wear system 690 that allows the transport surface 606 to remain in primary contact with the floor under the greatest load over time, while the annular wiper 602 remains at a safe cleaning contact load with the floor that does not allow for marking or scratches, but keeps the transport surface safe from debris. In another example embodiment, the transport surface 606 includes a wear indicator 642 that informs the user that the amount of material worn from the bottom of the transport surface is no longer sufficient to provide protection to the floor.

FIGS. 29-35 illustrate a perspective view of a repel assembly 700 constructed in accordance with another example embodiment of the present disclosure. The repel assembly 700 includes a dynamic wear system 790 that allows the transport surface to remain in primary contact with the floor based on the load provided by the object resting upon the assembly, while a lesser, secondary load is applied to an annular wiper that prevents debris from collecting on transport surface. The dynamic wear system 790 in addition, prevents the repel assembly from marking the floor while also facilitating the annular wiper's ability to prevent the collection of dust or debris on the transport surface during use. The repel assembly 700 includes an annular wiper 702, transport surface 706, support plate 708, plurality of spikes 710, and engagement surface 712.

In the illustrated example embodiment, the annular wiper 702 is integrally molded into the support plate 708, and both are made from plastic. The annular wiper 702 engages the floor with a secondary load 703 while in contact with the floor, allowing it to act as a dust cover, repelling debris from attracting to the transport surface 706.

The repel assembly's 700 engagement surface 712 includes a plurality of spikes 714 for attaching to an object such as furniture, or the bottom of a leg, chair, ottoman, dresser, and the like. That is, the repel assembly 700 is fixedly attached to form a secured connection to an object (not shown) such as a furniture leg through the combination of an adhesive bond 716 located on the engagement surface 712 and plurality of attachment spikes 714 fixed to the support plate 708 and projecting away from the engagement surface.

The transport surface 706 in the illustrated example embodiment is made from a cushion-like material, such as foam or felt that contacts the floor on which the object is located. The transport surface 706 is located below the support plate 708, which advances the transport surface under a primary load 701 carried by the object out of an opening 734. Since the primary load 701 generated by the object is greater than the secondary load 703 applied to the annular wiper 702, marking or scratching of the floor is avoided. This prevention of scratches or marks on the floor and is achieved by the repel assembly's dynamic wear system 790.

The dynamic wear system 790 generated by the primary and secondary loads, protect the floor from marring or damage during movement of the object across the surface of the floor. The secondary load imposed on the annular wiper at a lesser amount since bellows 704 act as shock absorbers, reducing the loading force on the annular wiper, thus preventing marking or scratches to the floor.

In the illustrated example embodiment, the engagement surface 712, transport surface 706, support plate 708, and annular wiper 702 are circularly shaped, but could be constructed to include any geometrical shape to match the geometry profile of the object in which the repel assembly 700 is secured without departing from the spirit and scope of the present disclosure.

Figure 29:
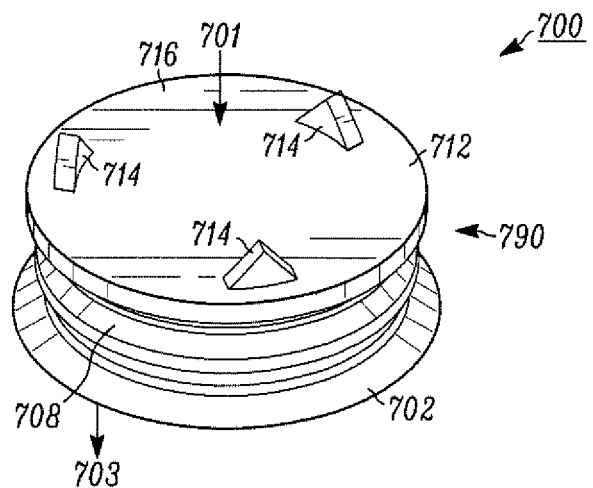
FIG. 29 is an upper perspective view of a repel assembly constructed in accordance with another example embodiment of the present disclosure.
Figure 30:
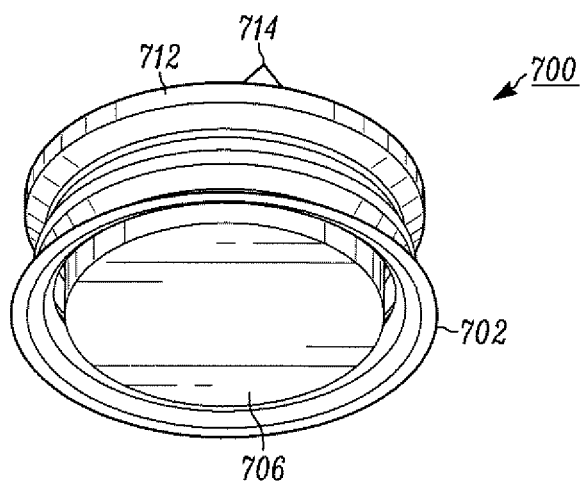
FIG. 30 is a lower perspective view of FIG. 29.
Figure 31:
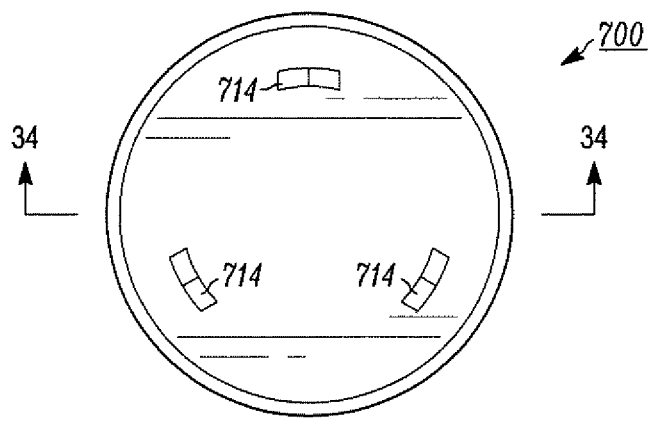
FIG. 31 is a top plan view of FIG. 29.
Figure 32:
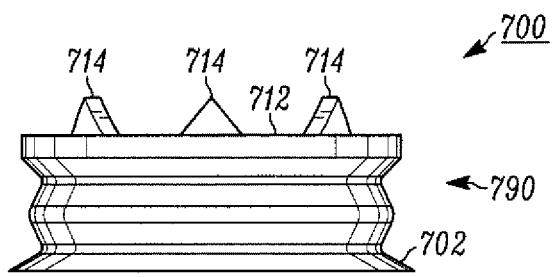
FIG. 32 is a side elevation view of FIG. 29.
Figure 33:
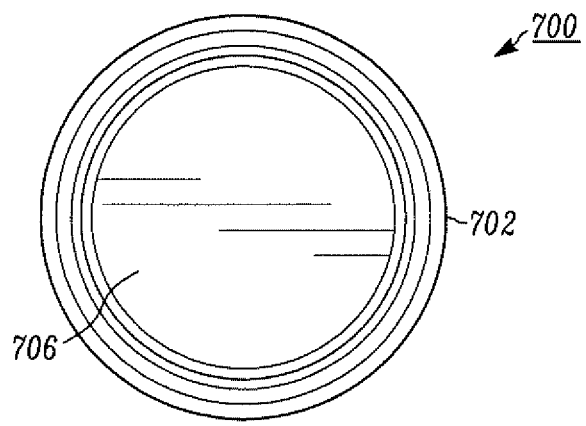
FIG. 33 is a bottom plan view of FIG. 29.
Figure 34:
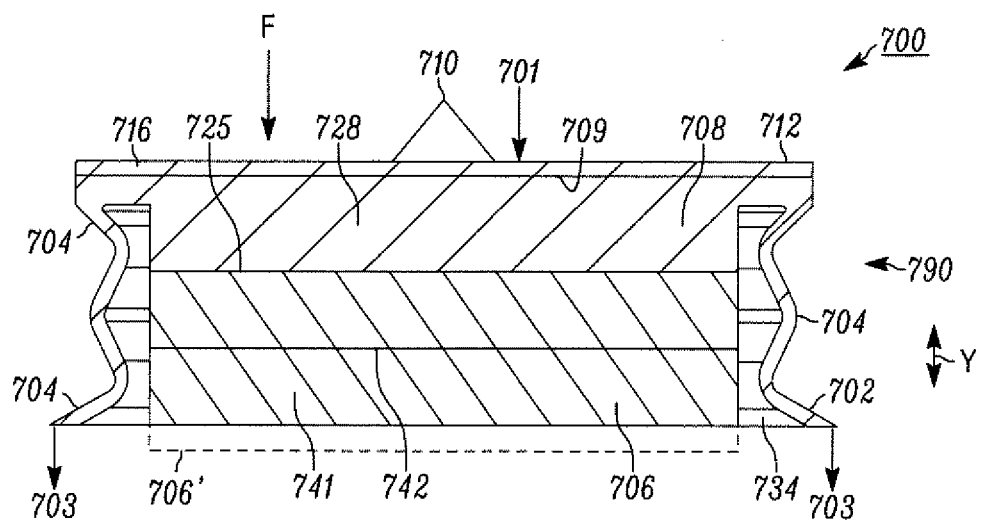
FIG. 34 is a section view of FIG. 31 along section lines 34-34.
Figure 35:
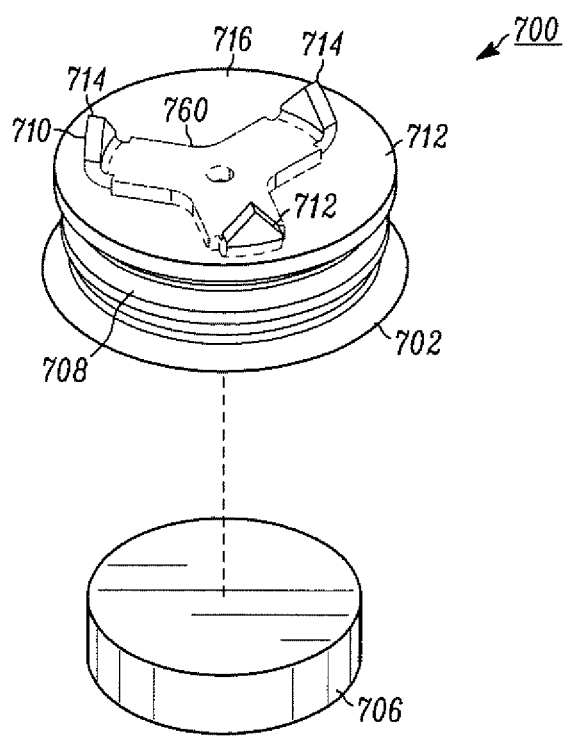
FIG. 35 is an exploded perspective view of FIG. 29.

Illustrated in FIGS. 31-33, are the top, side elevation, and bottom plan views of the example embodiment of FIG. 29. FIG. 27 illustrates an exploded perspective view of the example embodiment of FIG. 29. In the illustrated example embodiment, except for the metal spikes 710, transport surface 706, and adhesive 716, the entire assembly 700 is formed from plastic. In one example embodiment, the transport surface 706 is felt, a polymer such as polyethylene or polypropylene, or foam material, capable of preventing marring or marking of the floor during use.

A metal fixture 760 forming the plurality of attachment spikes 710 is seated into a form or fixture (not shown) in the top of the support plate 708. The engagement surface 712 comprises the double-sided adhesive 716, allowing for adhesive bonding to both the object (not shown) and repel assembly 700. In the illustrated example embodiment, the engagement surface 712 is approximately $\frac{1}{32}$" of one-inch thick and the upper side includes a protective sheet to cover the adhesive surface that is removed upon assembly or attachment to the object.

In addition to the adhesive bond, the plurality of attachment spikes penetrate the engagement surface 712 during assembly. This penetration assists in the securing of the engagement surface 712 to the object.

The plurality of attachment spikes 714 protrude from the attachment surface 712 approximately $\frac{1}{16}$" of one inch and include a total of three located equally at 120 degrees from each other. This allows for securing to the object for transport, such as a wooden leg of furniture without the need of a hammer or tools. While the penetration of the spikes 714 are advantageously designed in size and configuration to eliminate the need for tools, the spikes' 714 design and configuration in combination with the adhesive bond of the engagement surface 712 provide sufficient strength to resist separation after attachment, shear stresses, or failure during transport of the object.

In the illustrated example embodiment of FIGS. 29-35, the adhesive engagement surface 712 and metal fixture 760 are secured to the upper side 709 of the support plate 708. The support plate 708 is moveably secured (in the direction of arrows Y in FIG. 34) to the annular wiper 702 through the molded bellows 704 connection. An adhesive connection 725 connects a diametrical central post 728 of the of the support plate 708/wiper 702 to the transport surface 706.

The dynamic wear system 790 formed in part by the bellows 704, allows for the vertical movement or translation of the support plate 708 and transport surface 706, as indicated by arrows Y. The bellows 704 are molded into the plastic support plate 708 between the annular wiper 702 and plate and include a number of undulation about the periphery of the plate and wiper. The bellows 704 absorb energy, creating the lesser secondary load 703 relative to the primary load 701 carried by the transport surface 706, thus preventing marking while contacting the floor and eliminating the collection of debris on the transport surface.

During use, the weight of the object acting down on the repel assembly 700 (as indicated by the arrow F in FIG. 27) causes the downward movement or translation of the support plate 708 and its bellows 704 as described above, and accordingly, the movement of the support plate diametrical center post 728. The center post 728 thereby engages in its entirety and substantially uniformly, the transport surface 706, thus advancing the transport surface (706' shown in phantom) out of an opening 734 in the bottom of the annular wiper 702. The lesser, secondary load 703 originated by the object is reduced and absorbed by the bellows 704 before being applied to the annular wiper 702. This prevents the annular wiper 702 from marring or marking the floor, yet it remains in contact with the floor to prevent dust and debris from collecting on the transport surface 706.

The dual loading nature of the primary load 701 and secondary load 703 of the dynamic wear system 790, advantageously prevents collection of dirt, dust, hair, and debris from collecting to or near the transport surface 706, while preventing the floor from being damaged over time even as the material 741 wears away from the transport surface. Stated another way, the repel assembly 700 includes the dynamic wear system 790 that allows the transport surface 706 to remain in primary contact with the floor under the greatest load over time, while the annular wiper 702 remains at a safe cleaning contact load with the floor that does not allow for marking or scratches, but keeps the transport surface safe from debris. In another example embodiment, the transport surface 706 includes a wear indicator 742 that informs the user that the amount of material worn from the bottom of the transport surface is no longer sufficient to provide protection to the floor.

FIGS. 36-44 illustrate a repel assembly 800 constructed in accordance with another example embodiment of the present disclosure. The repel assembly 800 includes a dynamic wear system 890 that allows the transport surface to remain in primary contact with the floor based on the load provided by the object resting upon the assembly, while a lesser, secondary load from the object is applied to an annular wiper that prevents debris from collecting on transport surface. The dynamic wear system 890 in addition, prevents the repel assembly from marking the floor while also facilitating the annular wiper's ability to maintain constant contact with the floor, thus preventing the collection of dust or debris on the transport surface during use. The repel assembly 800 includes an annular wiper 802, transport surface 806, contact member 808, support plate 809, plurality of spikes 810, and engagement surface 812.

In the illustrated example embodiment, the annular wiper 802 is integrally molded into or with the support plate 809, and both are made from plastic. In one example embodiment, the support plate 809 and annular wiper are made from low density polyethelene (LDPE). The annular wiper 802 engages the floor with a secondary load represented by $F_{y1}, F_{y2}$, 803 (in FIGS. 42-43), while in contact with the floor, allowing it to act as a dust cover, repelling debris from attracting to the transport surface 806.

The repel assembly's 800 engagement surface 812 includes a plurality of spikes 810 for attaching to an object such as furniture, or the bottom of a leg, chair, ottoman, dresser, and the like. That is, the repel assembly 800 is fixedly attached to form a secured connection to an object (not shown) such as a furniture leg through the combination of an adhesive bond 816 located on the engagement surface 812 of the contact member 808 and plurality of attachment spikes 810 fixed or molded into the support plate 809 and projecting away from the engagement surface. In the illustrated example embodiment, the plurality of spikes are over-molded into the support plate 809.

The transport surface 806 in the illustrated example embodiment is made from a cushion-like material, such as foam or felt that contacts the floor on which the object is located. The transport surface 806 is located below the support plate 809, which advances the transport surface under a primary load represented by $F_1, F_2$, and 801 (in FIGS. 42-44) carried by the object out of an annular opening 834. In one example embodiment, the bottom and top surfaces of the support plate 809 that engage the transport surface 806 and contact member 808, respectively are textured in the mold in order to reduce movement of the surface and member. It should be appreciated by those skilled in the art that the transport surface 806 can either be press-fit into the annular opening 834 of the surface plate 809 and/or secured by an adhesive with the surface plate. Alternatively, the transport surface can be molded or hot melted into the surface plate in order to make a securing connection.

Because the primary load $F_1, F_2$, 801 generated by the object is axially transferred (see reference character Y in FIGS. 43 and 44) onto and taken up by the transport surface, the primary load is greater than the secondary load 803 applied to the annular wiper 802. The secondary load 803 applied to the annular wiper 802 is also less than the primary load 801 because of the reduced normal component $F_Y$ (see FIGS. 43 and 44) and as a result of the construction of the annular wiper, thus marking or scratching of the floor is avoided, as well as the reduction of dust and debris from collecting on the transport surface 806 common to felt furniture glides. This prevention of scratches or marks on the floor and is achieved by the repel assembly's dynamic wear system 890.

Figure 42:
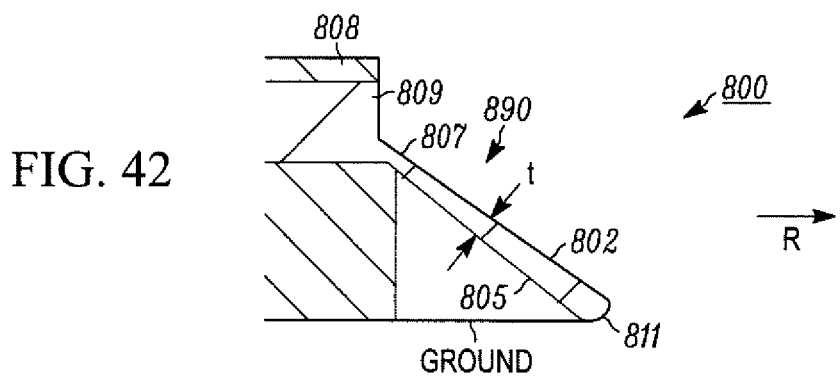
FIG. 42 is a portion of the sectional view of FIG. 41 illustrating the repel assembly in an unloaded position.
Figure 43:
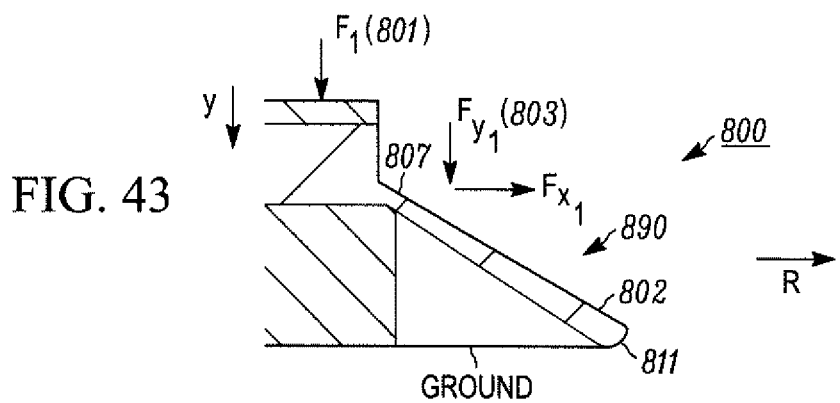
FIG. 43 is a portion of the sectional view of FIG. 41 illustrating the repel assembly in a first loaded/wear position.
Figure 44:
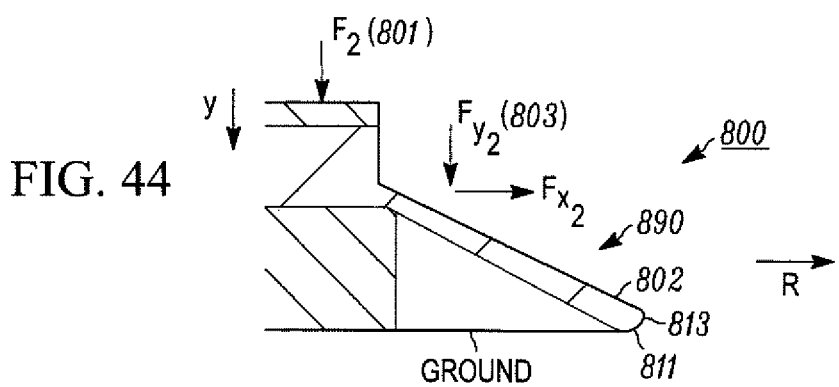
FIG. 44 is a portion of the sectional view of FIG. 41 illustrating the repel assembly in a second loaded/wear position.
Figure 45:
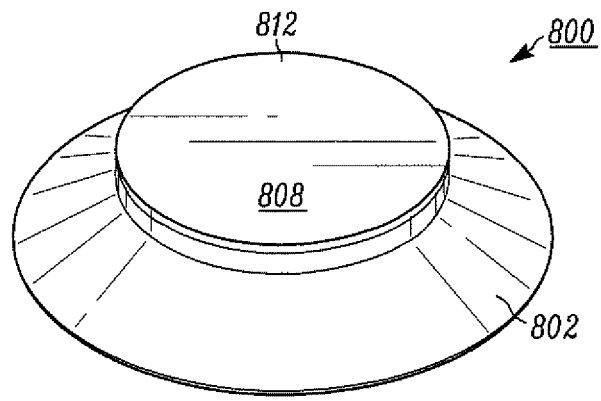
FIG. 45 is an upper perspective view of a repel assembly constructed in accordance with another example embodiment of the present disclosure.
Figure 46:
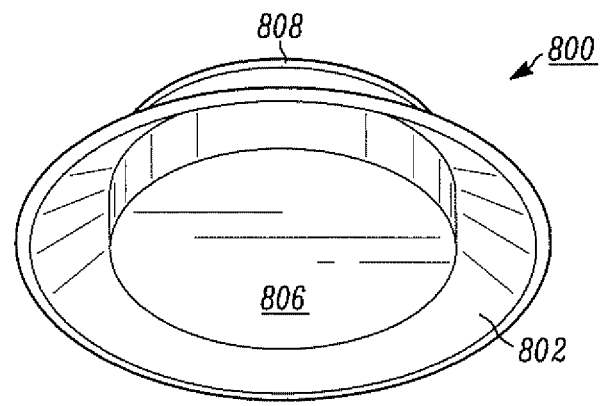
FIG. 46 is a lower perspective view of FIG. 45.
Figure 47:
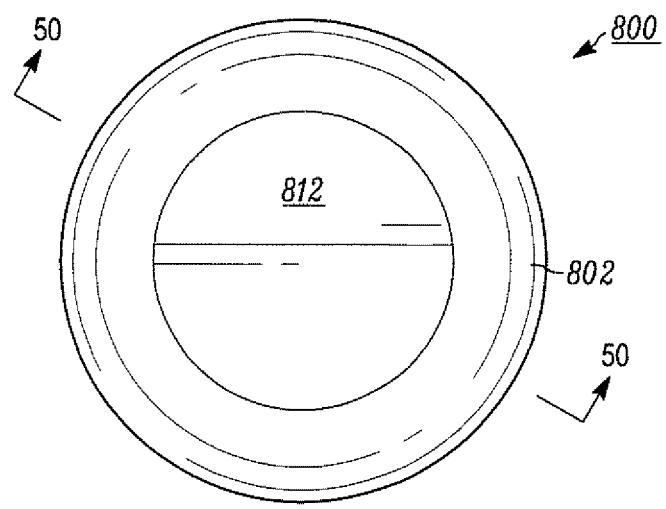
FIG. 47 is a top plan view of FIG. 45.
Figure 48:
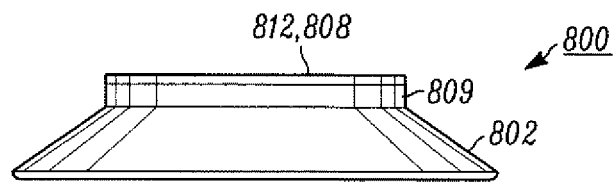
FIG. 48 is a side elevation view of FIG. 45.
Figure 49:
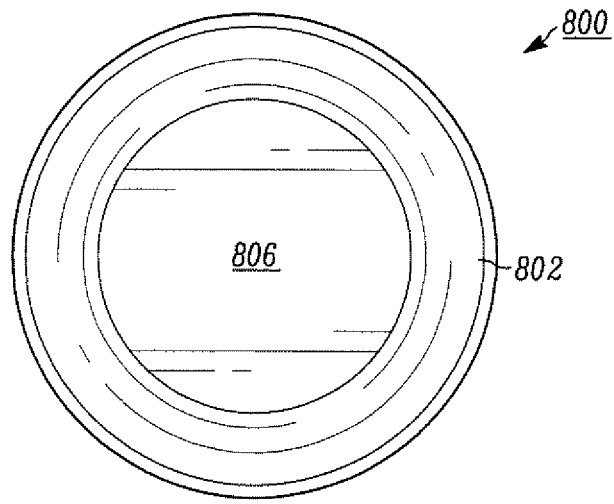
FIG. 49 is a bottom plan view of FIG. 45.
Figure 50:
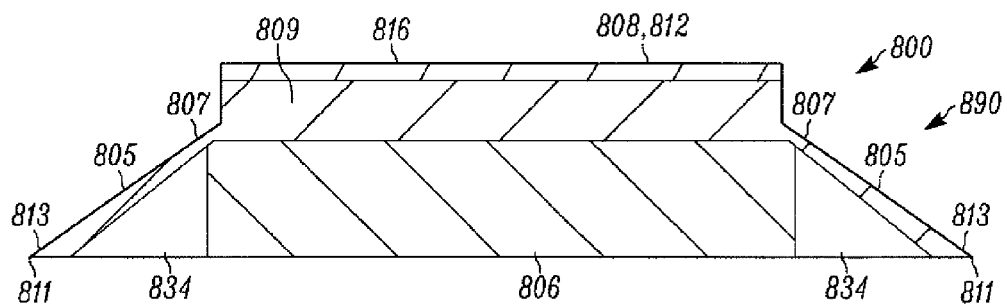
FIG. 50 is a section view of FIG. 47 along section lines 50-50.

The reduction in the collection of debris on the transport surface 806 attributed to the annular wiper 802 construction is best seen in FIGS. 42-44. The annular wiper includes a cover or arm 805, extending from the support plate 809 at a first end 807 to a second end 811, which maintains constant contact with the ground or floor during loading and wear overtime. The second end 811 includes a lip 813 that prevents the wiper 802 from catching or snagging on imperfections found in the floor. In one example embodiment the lip 813 includes a radius, while in another example embodiment it is sharp pointed end as illustrated in FIG. 50.

The cantilevered extension of the annular arm 805 from the support plate, the reduction of the primary load 801 to a secondary load 803 on the arm, and the arm's reduced thickness or tapered construction shown in the arm from the first end 807 to the second end 811, advantageously allows the wiper 802 to maintain 360 degrees of contact with the floor during loading or wear of the transport surface 806 (as the felt or material is compressed with time). This contact is maintained even with the legs left on the floor when the object is tilted. That is, an object is tilted when less than all legs remain on the floor.

Figure 51:
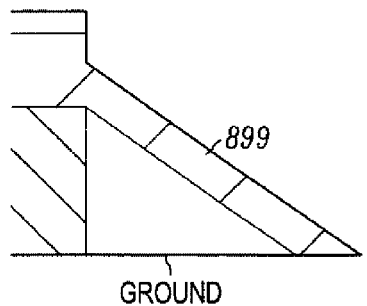
FIG. 51 is a portion of a sectional view of a repel assembly having a uniform cover thickness in an unloaded position.
Figure 52:
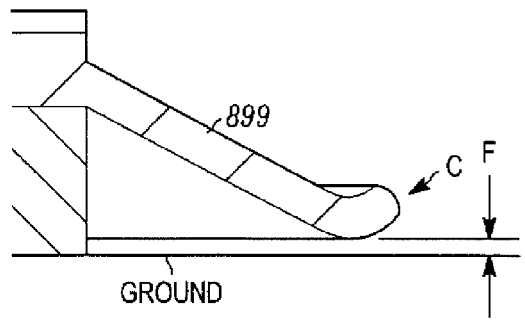
FIG. 52 is a portion of a sectional view of a repel assembly having a uniform cover thickness in a first loaded/wear position.
Figure 53:
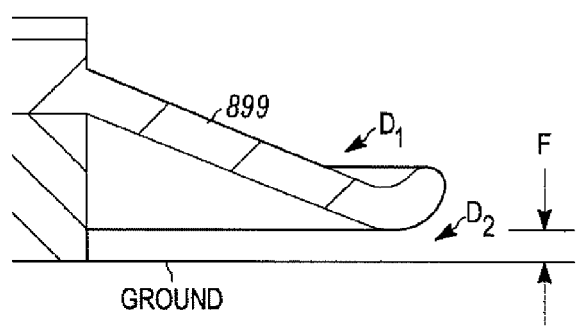
FIG. 53 is a portion of a sectional view of a repel assembly having a uniform cover thickness in a first loaded/wear position.

It can be seen in FIGS. 42-44 that as wear or greater loading occurs in the axial direction Y, the arm 805 continues to stretch or rotate radially outward in the direction of arrow R, while maintaining constant 360 degree contact with the floor. This is contrasted with an arm 899 of uniform thickness illustrated in FIGS. 51-53 that in testing proved to inadequately maintain contact with the ground as the load or wear increased as shown between FIGS. 52 and 53. The distance F increased between the ground and annular arm as illustrated in FIGS. 52 and 53 with an increase in object load or wear of felt on the transport surface 806. In addition, the second end of the arm had a tendency to undesirably curl as indicated by reference character C and collect debris in dust on top at D1 and below D2 of the arm when a uniform arm thickness was tested.

In the illustrated example embodiment of FIGS. 36-44, the overall diameter of the annular wiper 802 is one inch to one and one half inches in diameter. The thickness "t" of the annular arm 805 at the first end 807 is approximately 0.018" inches, while the thickness "t" of the annular arm 805 tapered to approximately three times that of the first end, that is, a thickness of 0.050" inches was found to be a suitable taper. In the same example embodiment, the felt or transport surface had a diameter of approximately 1" one inch. It should be appreciated by those skilled in the art that other sizes of proportionally scaled dimensions are intended to be within the scope and spirit of the claimed disclosure.

The dynamic wear system 890 generated by the primary and secondary loads, protect the floor from marring or damage during movement of the object across the surface of the floor. The secondary load imposed on the annular wiper 802 at a lesser amount since cantilevered arm 805 acts as a shock absorber, reducing the loading force on the annular wiper by component force $F_{X1}$ and/or $F_{X2}$ of the secondary force 803, illustrated in FIGS. 43 and 44, thus preventing marking or scratches to the floor.

In the illustrated example embodiment, the engagement surface 812, transport surface 806, support plate 809, and annular wiper 802 are circularly shaped, but could be constructed to include any geometrical shape to match the geometry profile of the object in which the repel assembly 800 is secured without departing from the spirit and scope of the present disclosure.

Figure 36:
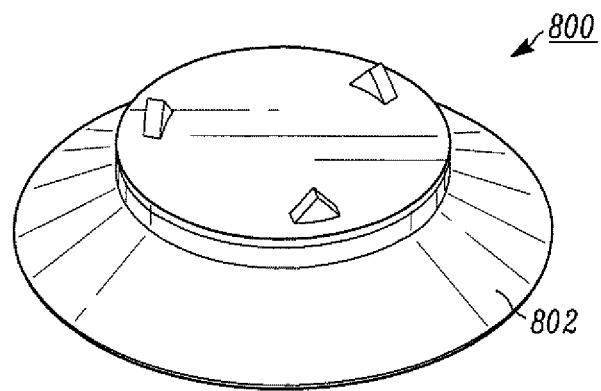
FIG. 36 is an upper perspective view of a repel assembly constructed in accordance with another example embodiment of the present disclosure.
Figure 37:
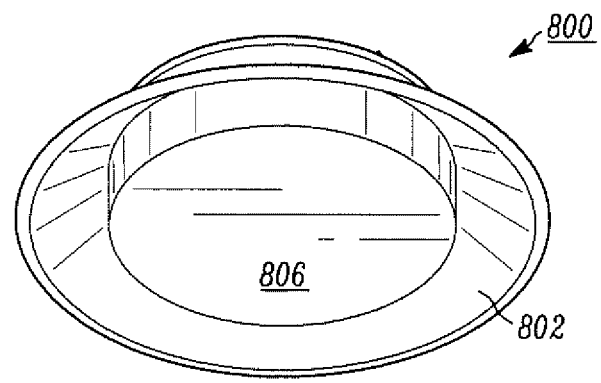
FIG. 37 is a lower perspective view of FIG. 36.
Figure 38:
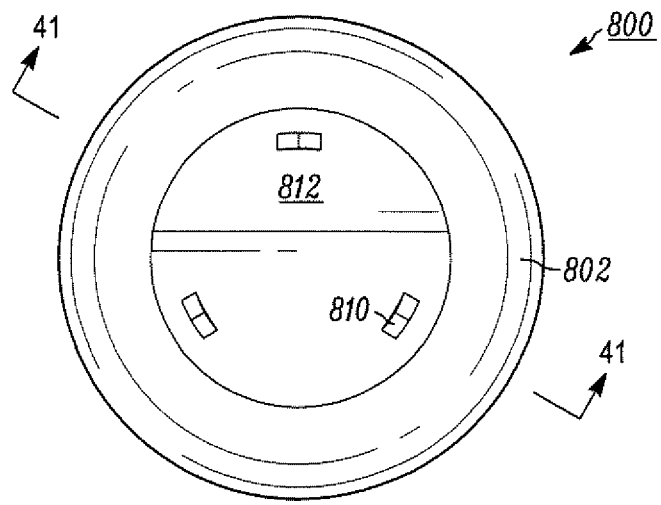
FIG. 38 is a top plan view of FIG. 36.
Figure 39:
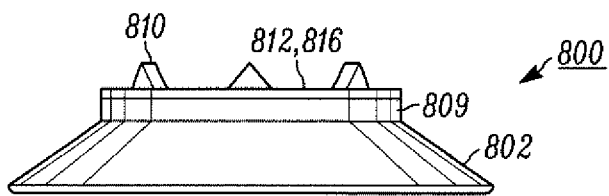
FIG. 39 is a side elevation view of FIG. 36.
Figure 40:
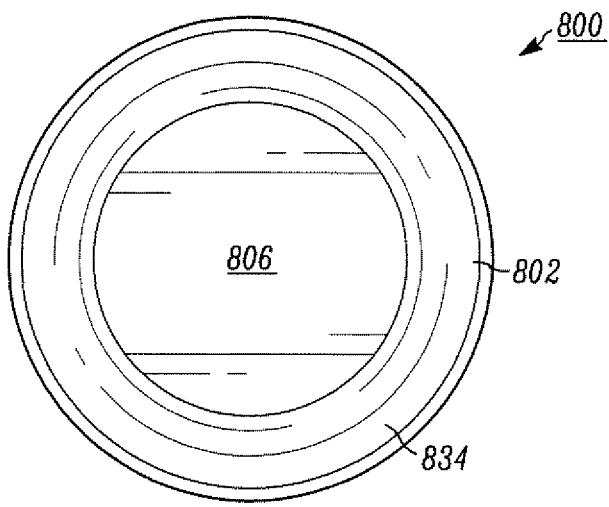
FIG. 40 is a bottom plan view of FIG. 36.

Illustrated in FIGS. 38-40, are the top, side elevation, and bottom plan views of the example embodiment of FIG. 36. In the illustrated example embodiment, except for the metal spikes 810, transport surface 806, and adhesive 816, the entire assembly 800 is formed from plastic, such as LDPE. In one example embodiment, the transport surface 806 is felt, a polymer such as polyethylene or polypropylene, or foam material, capable of preventing marring or marking of the floor during use.

In one example embodiment, a metal fixture 860 forming the plurality of attachment spikes 810 is seated into a form or fixture (not shown) in the top of the support plate 809. While in an alternative example embodiment, the metal spikes 810 along with the metal fixture 860 is over-molded into the support plate 809. It should be appreciated that while 3 separate spikes are shown in the plurality of spikes 810, the plurality of spikes could be reduced to a single spike or more than three spikes without departing from the spirit and scope of the present disclosure.

The engagement surface 812 comprises the double-sided adhesive 816, allowing for adhesive bonding to both the object (not shown) and repel assembly 800. In the illustrated example embodiment, the engagement surface 812 is approximately 1/32" of one-inch thick and the upper side includes a protective sheet to cover the adhesive surface that is removed upon assembly or attachment to the object during use.

In addition to the adhesive bond framed by the double-sided adhesive 816, the plurality of attachment spikes 810 penetrate the engagement surface 812 during assembly. This penetration assists in the securing of the engagement surface 812 to the object.

The plurality of attachment spikes 810 protrude from the attachment surface 812 approximately 1/16" of one inch and include a total of three located equally positioned radially at 120 degrees from each other. This allows for securing to the object for transport, such as a wooden leg of furniture with the use of a small hammer or equivalent tool. While the penetration of the spikes 814 are advantageously designed in size and configuration in combination with the adhesive bond of the engagement surface 812 provide sufficient strength to resist separation after attachment, shear stresses, or failure during transport of the object.

Figure 41:
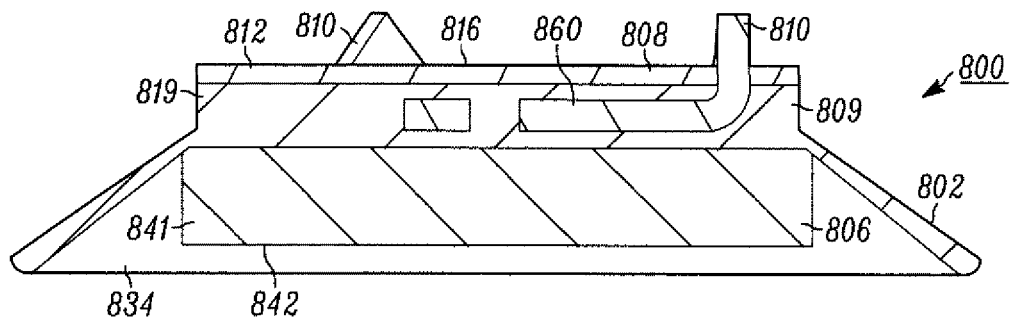
FIG. 41 is a section view of FIG. 38 along section lines 41-41.

In the illustrated example embodiment of FIGS. 36-41, the adhesive engagement surface 812 and metal fixture 860 are secured to the upper side 819 of the support plate 809. The metal fixture 860 in the example embodiment of FIG. 41 is molded into the support plate 809 along with the annular wiper when the repel assembly is formed.

The dynamic wear system 890 formed by the annular wiper 802 and its tapered arm 805 thickness, allows for the horizontal movement or translation of the annular tapered arm when the support plate 808 and transport surface 806 translate vertically by the primary load 801, as indicated by arrow Y in FIGS. 43 and 44. The annular wiper 802 absorbs energy, creating the lesser secondary load 803 relative to the primary load 801 carried primarily by the transport surface 806, thus preventing marking while contacting the floor and eliminating the collection of debris on the transport surface. The primary load energy absorption occurs as a result of the vector components formed by $F_X$ and $F_Y$ in FIGS. 43 and 44, as well as, the tapered thickness in the arm. Thus, the annular wiper receives a lesser or secondary 803 load that is smaller than the primary load 801 formed by the object on the repel assembly 800. This lesser load 803 is small enough to prevent marking on the floor or surface in contact with the repel assembly 800, but great enough to result in constant contact around the wiper perimeter, thus repel dust and/or debris from contacting or accumulating on the transport surface 806.

During use, the weight of the object acting down on the repel assembly 800 (as indicated by the arrow $F_1$ and $F_2$ in FIGS. 43 and 44) causes the downward movement or translation of the support plate 809, the transport surface 806, and the wiper 802 as described above, and accordingly, the rotational movement at the first end 807 of the arm 805 allows at the second end 811 to maintain constant contact along the floor or ground. The lesser, secondary load 803 originated by the object is reduced and absorbed by the tapered arm 805, as discussed above. This prevents the annular wiper 802 from marring or marking the floor, yet it remains in contact with the floor to prevent dust and debris from collecting on the transport surface 806.

The dual loading nature of the primary load 801 and secondary load 803 of the dynamic wear system 890, advantageously prevents collection of dirt, dust, hair, and debris from collecting to or near the transport surface 806, while preventing the floor from being damaged over time even as the material 841 wears away from the transport surface. Stated another way, the repel assembly 800 includes the dynamic wear system 890 that allows the transport surface 806 to remain in primary contact with the floor under the greatest load over time, while the annular wiper 802 remains at a safe cleaning contact load with the floor that does not allow for marking or scratches, but keeps the transport surface safe from debris. In another example embodiment, the transport surface 806 includes a wear indicator 842 that informs the user that the amount of material worn from the bottom of the transport surface is no longer sufficient to provide protection to the floor.

Illustrated in FIGS. 45-50 is another example embodiment of the repel assembly 800 similarly constructed as the example embodiment of FIGS. 36-44, except, the example embodiment is without a plurality of cleats 810. Instead, the example embodiment of FIGS. 45-50 is a held to an object solely by adhesive layer 816 on the contact surface 808. In one example embodiment, the adhesive layer is double-sided tape.

While many of the above example embodiments have been described as having both spikes and adhesive connections with the object it should be appreciated by those skilled in the art that either spikes or adhesive connections can be used exclusively to connect with the object without departing from the spirit and scope of the claimed disclosure.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An assembly for repelling or preventing the collection of debris at the base of an object, the assembly comprising:
   a support plate having upper and lower regions, the upper region supporting an engagement surface having an adhesive plane for securing to an object;
   a transport surface positioned within an opening in said lower region of said support plate, the transport surface for making primary contact with the floor for carrying a first portion of a load of an object during use; and
   an annular wiper having first and second annular ends to form a tapered annular arm, the first end being integrally connected to said support plate and the second annular end extending from said first annular end, the annular wiper repelling and preventing debris from contacting and collecting on said transport surface.

2. The assembly of claim 1 wherein said annular tapered arm has a first material thickness at said first annular end and a second material thickness at said second material end, wherein said second material thickness is greater than said first material thickness.

3. The assembly of claim 1 wherein said second annular end comprise a sharp pointed annular end.

4. The assembly of claim 1 further comprising an adhesive member having adhesive bonding first and second sides, the first adhesive bonding side fixedly attached with said adhesive plane and said second adhesive bonding side to secure to an object during use.

5. The assembly of claim 4 wherein said support plate upper and lower regions further comprise a textured surface to prevent relative movement between the adhesive member and the support plate, and to prevent relative movement between the transport surface and support plate.

6. The assembly of claim 1 wherein said annular wiper includes a reduced area of thickness at said first end of said annular tapered arm to allow constant contact of the second end with a floor during use.

7. The assembly of claim 1 wherein said annular wiper includes a reduced area of thickness at said first end of said annular tapered arm such that said annular arm rotationally moves to maintain constant contact of said second end with a floor as a remaining portion of said load is applied to the assembly from an object during use.

8. A method for repelling or preventing the collection of debris at the base of an object, the method comprising the steps of:
   providing a support plate having upper and lower regions, the upper region supporting an engagement surface having an adhesive plane for securing to an object;
   positioning a transport surface within an opening in said lower region of said support plate, the transport surface for making primary contact with a floor for carrying a first portion of a load of an object during use; and
   integrally connecting by molding an annular wiper having first and second annular ends to form a tapered annular arm to said support plate, the second annular end extending from said first annular end, the annular wiper repelling and preventing debris from contacting and collecting on said transport surface.

9. An assembly for repelling or preventing the collection of debris at the base of an object, the assembly comprising:
   a contact member having an engagement surface with securing device for securing to an object;
   a support plate having top and bottom surfaces, the top surface supporting the contact member;
   a transport surface positioned within an opening in said bottom surface of said support plate, the transport surface for making primary contact with a floor for carrying a first portion of a load of an object during use; and
   an annular wiper having first and second annular ends to form a tapered annular arm, the first end being integrally connected to said support plate and the second annular end extending from said first annular end, the annular wiper repelling and preventing debris from contacting and collecting on said transport surface, a sealing lip further extending from said second annular end.

10. The assembly of claim 9 wherein the securing device includes an adhesive disposed on the engagement surface of the contact member.

11. The assembly of claim 9 wherein the contact member further includes a second surface with an adhesive for securing to the top surface of the support plate.

12. The assembly of claim 9 wherein said annular tapered arm has a first material thickness at said first annular end and a second material thickness at said second material end, wherein said second material thickness is greater than said first material thickness.

13. The assembly of claim 9 wherein said annular wiper includes a reduced area of thickness at said first annular end to allow constant contact of the second annular end with a floor during use.

14. The assembly of claim 9 wherein said annular wiper includes a reduced area of thickness at said first annular end such that said annular arm rotationally moves to maintain constant contact of said second annular end with a floor as a remaining portion of said load is applied to the assembly from an object during use.

15. The assembly of claim 9 wherein the sealing lip maintains constant 360 degree contact with a floor along said annular end.

16. The assembly of claim 9 wherein the sealing lip repels and prevents debris from contacting and collecting on said transport surface.

17. An assembly for repelling or preventing the collection of debris at the base of an object, the assembly comprising:
   a contact member having:
      an engagement surface with securing device for securing to an object, the securing device including an adhesive disposed on the engagement surface of the contact member; and
      a second surface with an adhesive for securing to the top surface of a support plate
   a support plate having top and bottom surfaces, the top surface being secured to the second surface of the contact member;
   a transport surface positioned within an opening in said bottom surface of said support plate, the transport surface for making primary contact with a floor for carrying a first portion of a load of an object during use; and
   an annular wiper configured for carrying a second portion of the load of the object during use, the annular wiper having:

a first annular end integrally connected to said support plate, the first annular end having a first material thickness;

the second annular end extending from said first annular end to form a tapered arm, the second annular end having a second material thickness at said second material end, said second material thickness being greater than said first material thickness; and a sealing lip extending from said second annular end, the sealing lip maintaining constant 360 degree contact with the floor along the second annular end to repel and prevent debris from contacting and collecting on said transport surface.

* * * * *